(12) United States Patent
Funamoto et al.

(10) Patent No.: US 8,385,396 B2
(45) Date of Patent: Feb. 26, 2013

(54) WAVEFORM EQUALIZER AND METHOD FOR CONTROLLING THE SAME, AS WELL AS RECEIVING APPARATUS AND METHOD FOR CONTROLLING THE SAME

(75) Inventors: Kazuhisa Funamoto, Kanagawa (JP); Koji Naniwada, Tokyo (JP); Tien Dzung Doan, Kanagawa (JP)

(73) Assignee: Sony Corporation, Tokyo (JP)

( * ) Notice: Subject to any disclaimer, the term of this patent is extended or adjusted under 35 U.S.C. 154(b) by 484 days.

(21) Appl. No.: 12/671,228

(22) PCT Filed: Aug. 6, 2008

(86) PCT No.: PCT/JP2008/064088
§ 371 (c)(1),
(2), (4) Date: Jan. 29, 2010

(87) PCT Pub. No.: WO2009/020139
PCT Pub. Date: Feb. 12, 2009

(65) Prior Publication Data
US 2010/0208787 A1    Aug. 19, 2010

(30) Foreign Application Priority Data

Aug. 6, 2007 (JP) ................................ P2007-203852

(51) Int. Cl.
*H03H 7/30* (2006.01)
*H03H 7/40* (2006.01)
*H03K 5/159* (2006.01)

(52) U.S. Cl. ......................................... 375/229; 333/18
(58) Field of Classification Search .................... 375/229
See application file for complete search history.

(56) References Cited

U.S. PATENT DOCUMENTS

| 5,252,932 A | 10/1993 | Someya et al. |
| 5,999,349 A * | 12/1999 | Choi ............................... 360/46 |
| 6,038,251 A * | 3/2000 | Chen ............................. 375/222 |
| 6,441,843 B1 * | 8/2002 | Limberg ......................... 348/21 |
| 6,856,655 B1 * | 2/2005 | Garcia ........................... 375/326 |
| 7,339,989 B1 * | 3/2008 | McAdam et al. ............. 375/232 |
| 2001/0026578 A1 * | 10/2001 | Ando ............................ 375/130 |
| 2002/0057713 A1 * | 5/2002 | Bagchi et al. ................. 370/468 |
| 2003/0081670 A1 * | 5/2003 | Bologna et al. ............... 375/234 |
| 2005/0129107 A1 | 6/2005 | Park et al. |

FOREIGN PATENT DOCUMENTS

| EP | 0 466 434 | 1/1992 |
| JP | 02-218229 | 8/1990 |
| JP | 3 244220 | 10/1991 |

(Continued)

*Primary Examiner* — Erin File
(74) *Attorney, Agent, or Firm* — Frommer Lawrence & Haug LLP; William S. Frommer; Ellen Marcie Emas

(57) ABSTRACT

The present invention relates to a waveform equalizer and a method for controlling the same, as well as a receiving apparatus and a method for controlling the same whereby better receiving characteristics are provided than before.
In a filter 28, registers $91_1$ through $91_5$ delay an input DT1; multipliers $92_0$ through $92_5$ multiply outputs from the registers by filter coefficients $C_{20}$ through $C_{25}$ respectively; and adders $93_1$ through $93_5$ add up outputs from the multipliers to acquire DT2. A selector 81 either outputs a timing signal at intervals of a symbol period of DT1 to drive the filter 82 as a symbol rate equalizer, or outputs the timing signal at intervals of half the symbol period to operate the filter 82 as a fractionally spaced equalizer. The present invention may be applied to waveform equalizers performing waveform equalization of the input signal.

10 Claims, 15 Drawing Sheets

FOREIGN PATENT DOCUMENTS

| | | |
|---|---|---|
| JP | 4 68910 | 3/1992 |
| JP | 4 70065 | 3/1992 |
| JP | 4 208706 | 7/1992 |
| JP | 10 93391 | 4/1998 |
| JP | 11 261457 | 9/1999 |
| JP | 2989268 | 10/1999 |
| JP | 2004 158939 | 6/2004 |
| JP | 2005 523642 | 8/2005 |

* cited by examiner

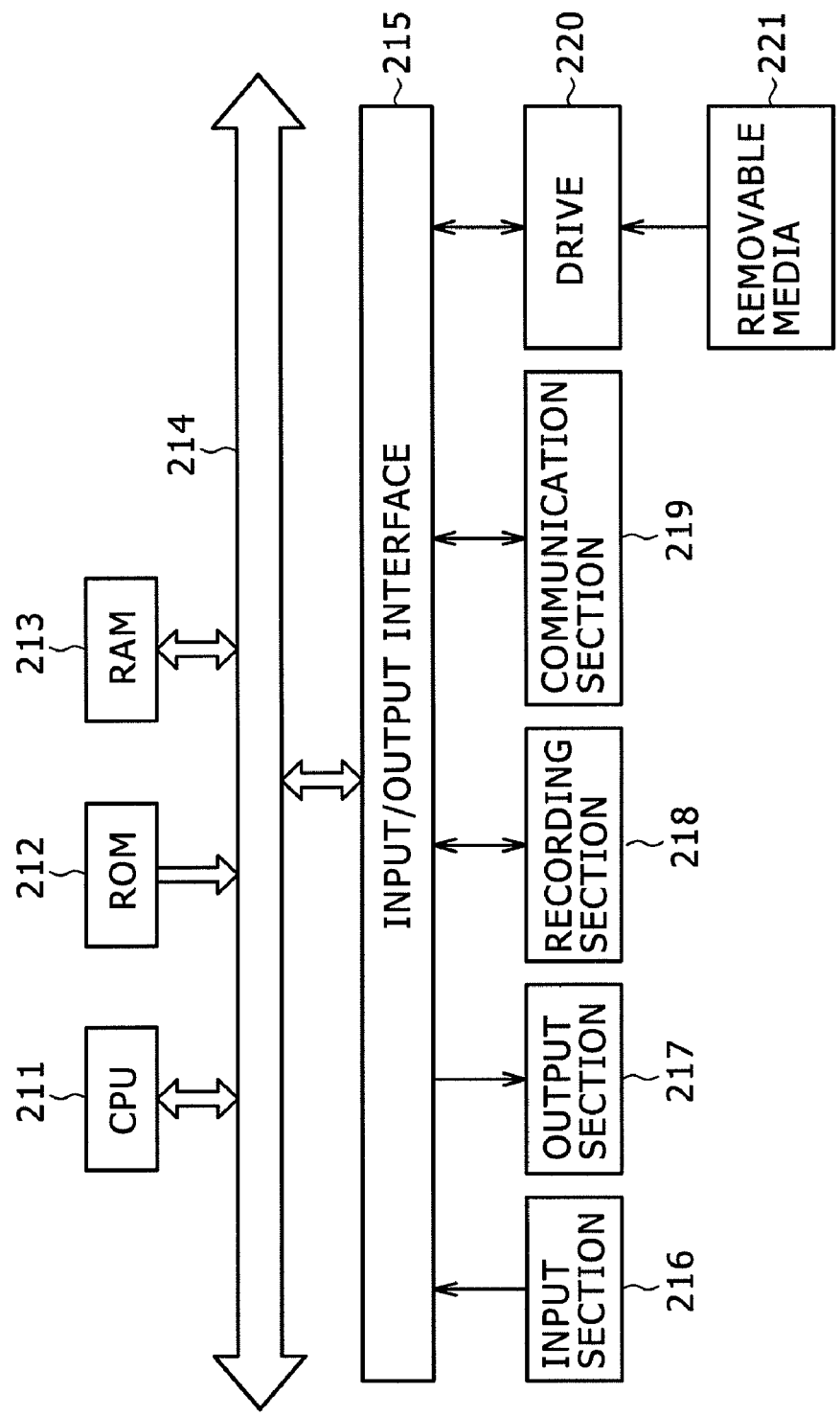

WAVEFORM EQUALIZER AND METHOD FOR CONTROLLING THE SAME, AS WELL AS RECEIVING APPARATUS AND METHOD FOR CONTROLLING THE SAME

TECHNICAL FIELD

The present invention relates to a waveform equalizer and a method for controlling the same, as well as a receiving apparatus and a method for controlling the same. More particularly, the invention relates to a waveform equalizer and a method for controlling the same, as well as a receiving apparatus and a method for controlling the same whereby better receiving characteristics are provided than before.

BACKGROUND ART

In signal transmission systems, received waves can be distorted due to reflected waves occurring over transmission channels. For example, in the case of a terrestrial wave TV broadcast, the radio waves direct from a transmitting tower are interfered with by the waves coming therefrom but getting detoured through reflection on buildings and mountains before arrival, as shown in FIG. 1. Such interference between direct and reflected waves has been known as "ghost" since the era of analog TV broadcasting. It is still a big problem affecting the receiving characteristics of digital TV broadcasts.

Illustratively, as shown in FIG. 2, comparing the spectrum in effect when there are no reflected waves (shown on the left) with the spectrum in effect when there are reflected waves (shown on the right) reveals the following: that whereas power density is held constant with regard to frequency when there are no reflected waves (on the left), the level of power density drops at a certain frequency where signal distortion is caused by reflected waves (on the right).

The waveform equalizer is used as a device to remove such distortion. There are diverse structures of the waveform equalizer. Generally, the waveform equalizer may be structured as a filter having a coefficient that constitutes the reverse characteristic of the transmission channel in use. FIG. 3 is explanatory of a waveform equalizer structured in such a manner.

As shown in FIG. 3, if the frequency characteristic of the channel coming from a broadcasting station is assumed to be H(f), then the waveform equalizer inside a receiving device receiving the broadcast signal is arranged to have a frequency characteristic of 1/H(f). This allows the waveform equalizer to output a interference-free signal to a demodulating/decoding section located downstream. That is, even if there exist reflected waves, it is possible to provide a spectrum without a dip as shown on the left of FIG. 2.

FIG. 4 shows a structure of a waveform equalizer. This waveform equalizer is made up of registers $11_1$ through $11_n$ each delaying the input signal by one clock pulse for output to the immediately subsequent stage, multipliers $12_0$ through $12_n$ each multiplying the input signal by one of filter coefficients (tap coefficients) $C_{10}$ through $C_{1n}$, and adders $13_1$ through $13_n$ adding up the products from the multipliers $12_0$ through $12_n$.

In the waveform equalizer of FIG. 4, the registers $11_1$ through $11_n$ delay the input received signal by one clock pulse each, and the received signal thus delayed is multiplied by each of the filter coefficients (tap coefficients) $C_{10}$ through $C_{1n}$ by each of the multipliers $12_0$ through $12_n$. Then, the adders $13_1$ through $13_n$ add up the products from the multipliers $12_0$ through $12_n$. The resulting sum of the products is output as an equalized signal.

As a result, the equalized signal is an interference-free signal. Incidentally, the filter coefficients by which the delayed received signal is multiplied by each of the multipliers $12_0$ through $12_n$ are acquired in keeping with impulse responses as shown in FIG. 5, to be discussed later.

Also, the waveform equalizers are roughly classified by the operating frequency into symbol rate equalizers and fractionally spaced equalizers.

Parenthetically, the symbol rate equalizer and fractionally spaced equalizer are discussed in detail in a book titled "Digital Communication," written by John G. Proakis and translated by Koichi Sakaniwa et al into Japanese, published by Kagaku Gijutsu Shuppan, Inc. in November 1999 (ISBN: 978-4-87653-073-1 (4-87653-073-4)).

Comparing the two types of waveform equalizers reveals the following: that the symbol rate equalizer drives its filter using the symbol frequency of the transmitted signal, and that the fractionally spaced equalizer effects the driving using a frequency higher than the symbol frequency (usually by use of the frequency acquired by multiplying the symbol frequency by an integer multiple). For these reasons, there exist the following advantages and disadvantages regarding the two types of waveform equalizers.

First of all, where there are a sufficient number of taps, the fractionally spaced equalizer can perform equalization more accurately than the symbol rate equalizer. This is because the symbol rate equalizer does not satisfy sampling theorem and is thus theoretically incapable of reproducing the transmitted signal, whereas the fractionally spaced equalizer satisfies sampling theorem and is thus theoretically capable of reproducing the transmitted signal.

Second, given the same number of taps, the symbol rate equalizer can deal with longer delayed waves than the fractionally spaced equalizer. This is because the ability of a waveform equalizer to deal with longer delayed waves is determined by the length of the impulse response that can be expressed by the waveform equalizer in question. That is, as shown in FIG. 5, a fractionally spaced equalizer operating at an n-fold symbol rate needs n times as many taps as those for the symbol rate equalizer in order to express the impulse response of the same length.

FIG. 5 is a graphic representation showing the relationship between impulse responses and filter coefficients.

In the graph of FIG. 5, the vertical axis stands for impulse responses. The higher the value along the vertical axis, the larger the impulse response value. The horizontal axis denotes the time of which the direction is from left to right as seen in the graph.

In FIG. 5, the arrows extending toward the waveform of the impulse response are spaced at intervals of T/2. Therefore, the space T for two arrows corresponds to the period of the symbol rate equalizer (i.e., symbol period), and the space T/2 for one arrow corresponds to the period of the fractionally spaced equalizer. That means the fractionally spaced equalizer requires twice as many taps as those for the symbol rate equalizer in order to express the impulse response of the same length.

If it were possible to have a sufficiently large number of taps, then a highly accurate fractionally spaced equalizer might well be utilized. However, always providing a sufficiently large number of taps is not realistic in terms of costs and other considerations. Thus the designers of waveform equalizers need to design optimal circuits by taking the above-mentioned advantages and disadvantages into account.

In view of such trade-offs, Patent Document 1 below proposes techniques whereby a symbol rate equalizer and a fractionally spaced equalizer are incorporated in a receiving apparatus in such a manner that one of them is selected for use depending on the channel. According to the proposal, a selection can be made between the symbol rate equalizer and the fractionally spaced equalizer as needed.

Patent Document 1: Japanese Patent Laid-open No. Hei 3-244220

DISCLOSURE OF INVENTION

Technical Problem

However, although ordinary techniques including those disclosed by the above-cited Patent Document 1 make the most of the advantages and disadvantages in performance of both the symbol rate equalizer and the fractionally spaced equalizer, the demodulating apparatus is required to accommodate two bulky blocks of waveform equalizers inside. This drives up costs.

Specifically, instead of incorporating two waveform equalizers and selecting one of them for use, an ideal waveform equalizer design may well involve installing a single waveform equalizer capable of offering the performance advantages of both the symbol rate equalizer and the fractionally spaced equalizer.

The present invention has been made in view of the above circumstances and provides a single waveform equalizer controlled selectively for use either as a symbol rate equalizer or a fractionally spaced equalizer.

Technical Solution

According to one aspect of the present invention, there is provided a waveform equalizer for performing waveform equalization of an input signal, the waveform equalizer including: a filter including at least a group of delay devices connected serially to delay the input signal successively, a group of multipliers for multiplying an output from each of the delay devices by a filter coefficient, and a group of adders for adding up outputs from the multipliers in order to acquire a waveform-equalized output signal; and timing signal selecting means for selecting either a first or a second timing signal for driving the filter, the first timing signal driving the filter at intervals of a period of a symbol frequency of the input signal, the second timing signal driving the filter at intervals of a period shorter than that of the symbol frequency. The filter is driven either as a symbol rate equalizer in accordance with the first timing signal selected or as a fractionally spaced equalizer in keeping with the second timing signal selected.

The timing signal selecting means may first select the second timing signal to drive the filter as the fractionally spaced equalizer, then switch from the second timing signal to the first timing signal in keeping with the value of the filter coefficient after an error signal has settled, and drive the filter as the symbol rate equalizer using the first timing signal.

The timing signal selecting means may select either the first timing signal or the second timing signal in such a manner as to minimize channel error rate.

The timing signal selecting means may select either the first timing signal or the second timing signal in such a manner as to minimize an error signal inside the waveform equalizer.

The filter coefficient may be a predetermined fixed value, and the filter may be driven as a fixed coefficient equalizer based on the filter coefficient.

The filter coefficient may be a value determined adaptively based on adaptive equalization algorithm, and the filter may be driven as an adaptive equalizer based on the filter coefficient.

The period shorter than that of the symbol frequency may have a frequency that is an integer multiple of the symbol frequency.

A controlling method according to the first aspect of the present invention corresponds to the above-described waveform equalizer according to the first aspect of this invention.

The waveform equalizer and the method for controlling the same according to the first aspect of the present invention thus involve the use of a filter including at least a group of delay devices connected serially to delay the input signal successively, a group of multipliers for multiplying an output from each of the delay devices by a filter coefficient, and a group of adders for adding up outputs from the multipliers in order to acquire a waveform-equalized output signal, the filter being driven by either a first or a second timing signal, the first timing signal being selected to drive the filter at intervals of a period of a symbol frequency of the input signal, the second timing signal being selected to drive the filter at intervals of a period shorter than that of the symbol frequency. The filter is driven either as a symbol rate equalizer in accordance with the first timing signal selected or as a fractionally spaced equalizer in keeping with the second timing signal selected.

According to a second aspect of the present invention, there is provided a receiving apparatus for receiving a modulated signal derived from digital modulation of a carrier wave, the receiving apparatus including: a filter including at least a group of delay devices connected serially to delay the input signal successively, a group of multipliers for multiplying an output from each of the delay devices by a filter coefficient, and a group of adders for adding up outputs from the multipliers in order to acquire a waveform-equalized output signal; and timing signal selecting means for selecting either a first or a second timing signal for driving the filter, the first timing signal driving the filter at intervals of a period of a symbol frequency of the input signal, the second timing signal driving the filter at intervals of a period shorter than that of the symbol frequency. The filter is driven either as a symbol rate equalizer in accordance with the first timing signal selected or as a fractionally spaced equalizer in keeping with the second timing signal selected.

A controlling method according to the second aspect of the present invention corresponds to the above-described receiving apparatus according to the second aspect of this invention.

The receiving apparatus and the method for controlling the same according to the second aspect of the present invention thus involve the use of a filter including at least a group of delay devices connected serially to delay the input signal successively, a group of multipliers for multiplying an output from each of the delay devices by a filter coefficient, and a group of adders for adding up outputs from the multipliers in order to acquire a waveform-equalized output signal, the filter being driven by either a first or a second timing signal, the first timing signal being selected to drive the filter at intervals of a period of a symbol frequency of the input signal, the second timing signal being selected to drive the filter at intervals of a period shorter than that of the symbol frequency. The filter is driven either as a symbol rate equalizer in accordance with the first timing signal selected or as a fractionally spaced equalizer in keeping with the second timing signal selected.

Advantageous Effects

According to the first aspect of the present invention, as described above, a single waveform equalizer is controlled selectively for use as a symbol rate equalizer or as a fractionally spaced equalizer offering higher receiving characteristics than before.

Also, according to the second aspect of the present invention, a single waveform equalizer is controlled selectively for use as a symbol rate equalizer or as a fractionally spaced equalizer offering higher receiving characteristics than before.

BRIEF DESCRIPTION OF DRAWINGS

FIG. 17 is a block diagram showing a typical structure of a personal computer.

EXPLANATION OF REFERENCE NUMERALS

31 Receiving apparatus, 41 RFIC, 42 Demodulating LSI, 43 Host CPU, 51 A/D converting section, 52 Sampling synchronizing section, 53 Waveform equalizer, 54 Error correcting section, 71 Fixed coefficient equalizer, Selector, 82 Filter, 83 Register, 84 Register, 85 Register, 91 Register, 92 Multiplier, 93 Adder, 101 Adaptive equalizer, 111 Selector, 112 Filter, 113 Register, 114 Register, 115 Register, 116 Arithmetic unit, 117 Delay circuit, 118 Register, 119 Multiplier, 120 Multiplier, 121 Adder, 122 Register, 123 Error signal computing section, 131 Register, 132 Multiplier, 133 Adder

BEST MODE FOR CARRYING OUT THE INVENTION

Some embodiments of the present invention will be described below in reference to the accompanying drawings.

Figure 1:
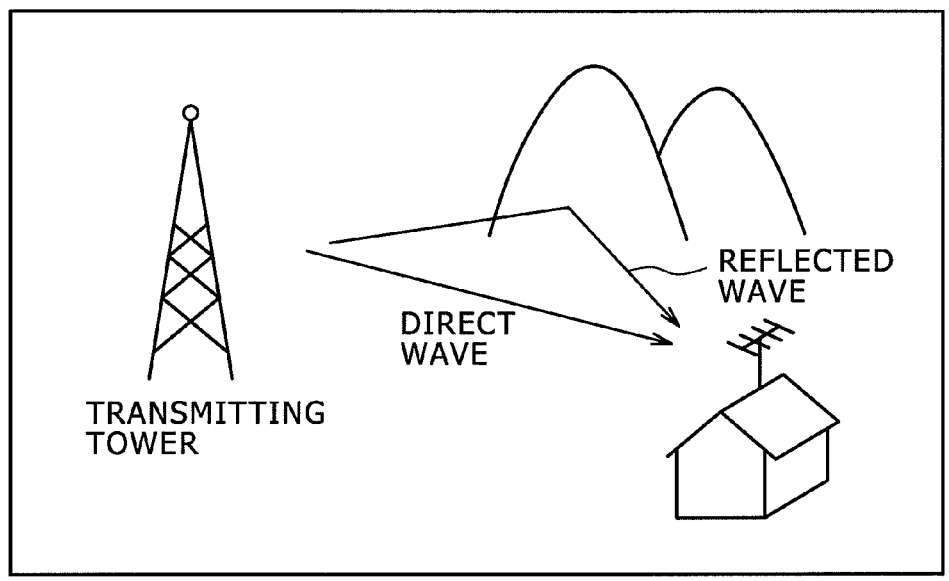
FIG. 1 is a view explanatory of radio interference.
Figure 2:
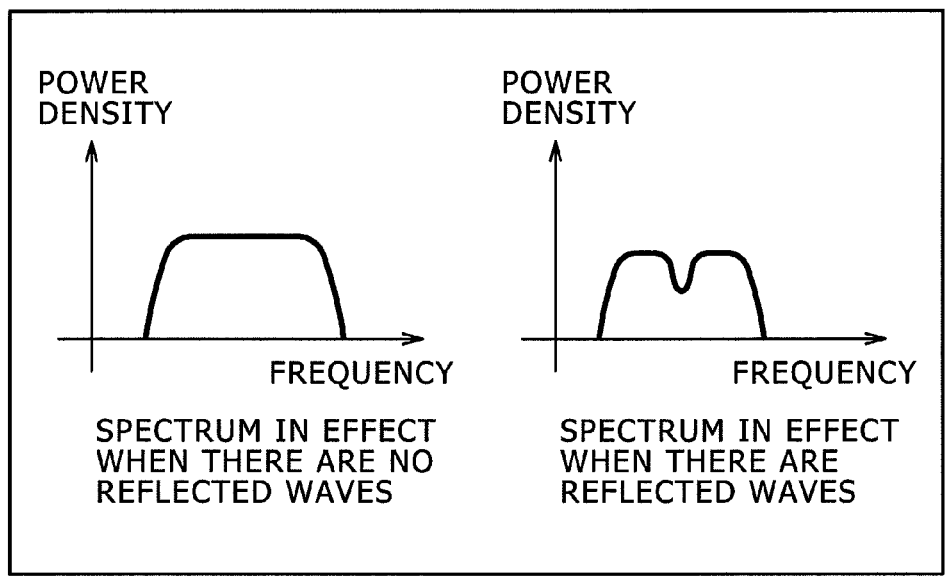
FIG. 2 is a view explanatory of changes in spectrum due to the presence or absence of reflected waves.
Figure 3:
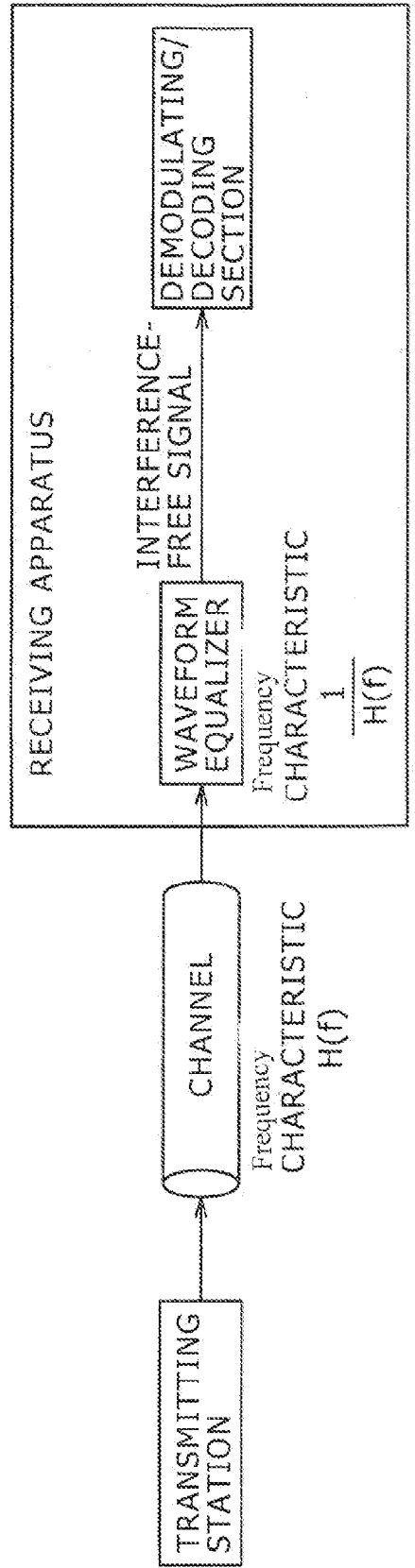
FIG. 3 is a view explanatory of a waveform equalizer.
Figure 4:
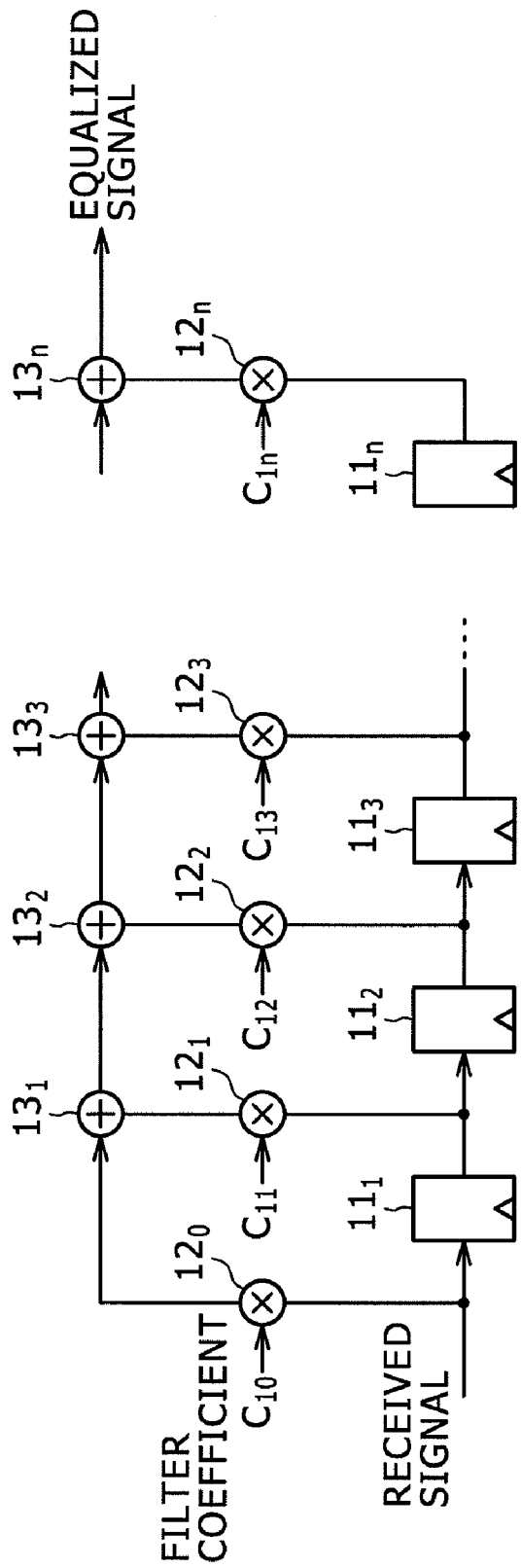
FIG. 4 is a circuit diagram showing a structure of an ordinary waveform equalizer.
Figure 5:
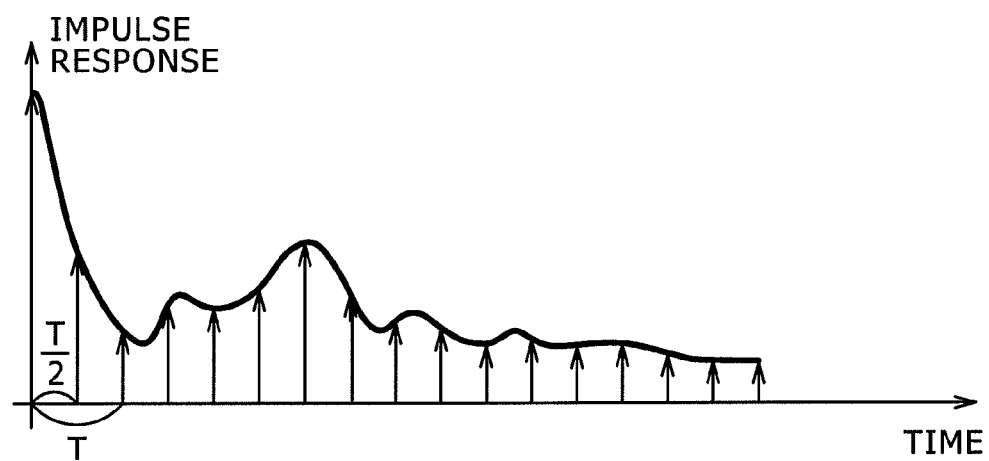
FIG. 5 is a graph showing the relationship between impulse responses and filter coefficients.
Figure 6:
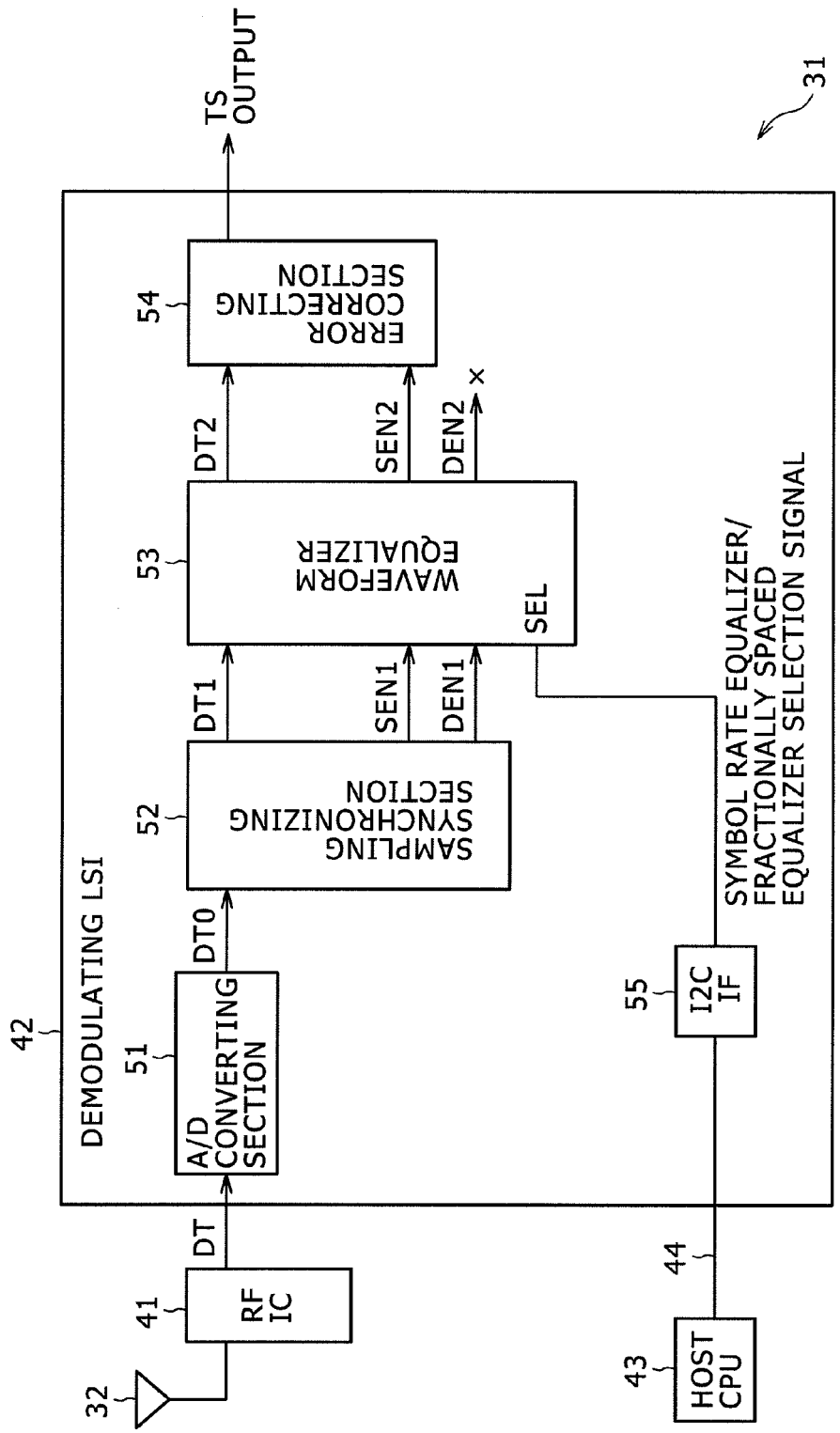
FIG. 6 is a block diagram showing a structure of a receiving apparatus embodying the present invention.

FIG. 6 is a block diagram showing a structure of a receiving apparatus embodying the present invention.

The receiving apparatus 31 is structured to include an RFIC (Radio Frequency Integrated Circuit) 41, a demodulating LSI (Large Scale Integration) 42, and a host CPU (Central Processing Unit) 43. In a system made up of the receiving apparatus 31 and an antenna 32 (called the digital TV receiving system hereunder), the broadcast wave of a BS (Broadcasting Satellite) digital broadcast from a broadcasting station is received illustratively by the antenna 32.

In the digital TV receiving system, the signal received by the antenna 32 is converted by the RFIC 41 into a baseband signal that is input to the demodulating LSI 42. In the ensuing description, the baseband signal input to the demodulating LSI 42 will be simply referred to as DT.

The demodulating LSI 42 performs predetermined processes on DT input from the RFIC 41 so as to acquire a transport stream (TS) that is then output.

The demodulating LSI 42 is structured to include an A/D (Analog/Digital) converting section 51, a sampling synchronizing section 52, a waveform equalizer 53, an error correcting section 54, and an I2CIF (Inter IC Interface) 55.

The A/D converting section 51 converts DT, which is an analog signal input from the RFIC 41, into a digital signal that is supplied to the sampling synchronizing section 52. In the ensuing description, the digital signal output from the A/D converting section 51 is called DT0.

The sampling synchronizing section 52 performs a symbol synchronizing process, which is a process for establishing the synchronization of a symbol point, on DT0 having undergone the conversion to digital form by the A/D converting section 51. More specifically, the symbol synchronizing process generates flags SEN1 and DEN1, the flag SEN1 indicating that DT1 constituting the received data before waveform equalization is a symbol point, the flag DEN1 indicating that DT1 is either a symbol point or an intermediate point between two symbol points.

The sampling synchronizing section 52 supplies the waveform equalizer 53 with the generated SEN1 and DEN1, as well as DT1 which constitutes the received data before waveform equalization and which corresponds to DT0.

Figure 7:
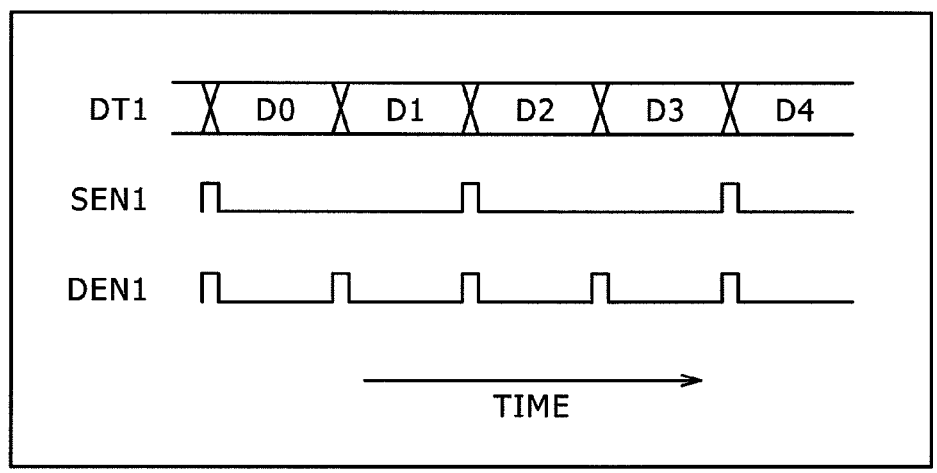
FIG. 7 is a timing chart explanatory of what is output by a sampling synchronizing section.

Explained below in reference to the timing chart of FIG. 7 is what is output by the sampling synchronizing section 52.

FIG. 7 is a timing chart that shows, from the top down, DT1, SEN1, and DEN1 as the data output from the sampling synchronizing section 52. The direction of time is from left to right as seen in the chart. This direction of time is the same in the other timing charts to be discussed later.

Figure 8:
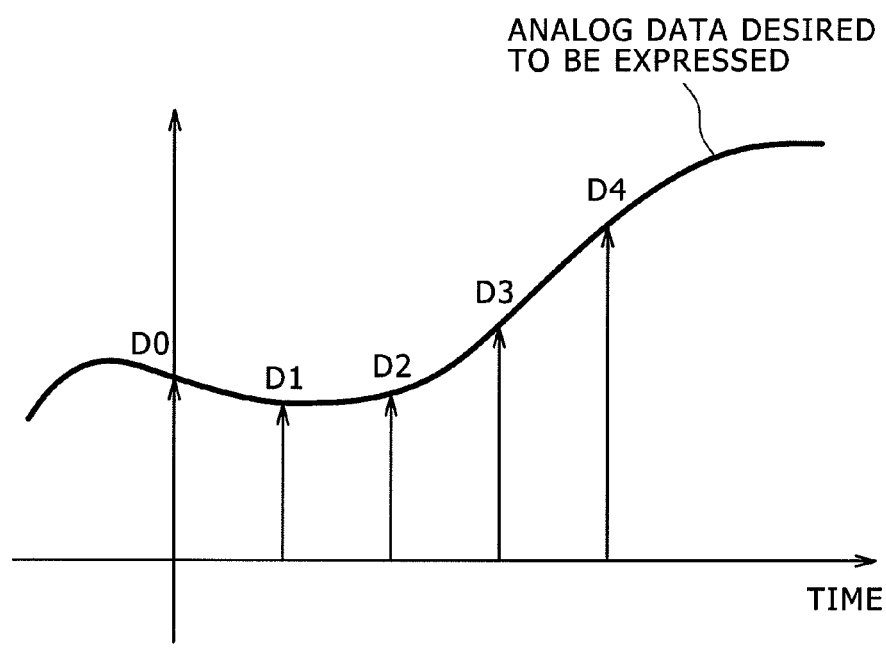
FIG. 8 is a view showing a typical sampling.

As shown in FIG. 7, the sampling synchronizing section 52 successively outputs D0, D1, D2, D3, D4, . . . as DT1 corresponding to DT0 input from the A/D converting section 51. The data D0, D1, D2, D3, D4, . . . have been sampled from the analog data desired to be expressed as shown in the graph of FIG. 8.

Returning to FIG. 7, the flag SEN1 goes High when DT1 is at a symbol point (i.e., D0, D2, D4, . . . ); otherwise SEN1 stays Low. Thus the flag SEN1 goes High at intervals of a symbol period.

The flag DEN1 goes High when DT1 is at a symbol point or at an intermediate point between two symbol points (i.e., D0, D1, D2, D3, D4, . . . ) as shown in FIG. 7; otherwise DEN1 stays Low. Thus the flag DEN1 goes High at intervals of half the symbol period. Going High at intervals of half the symbol period, the flag DEN1 is always High when the flag SEN1 is High.

Figure 9:
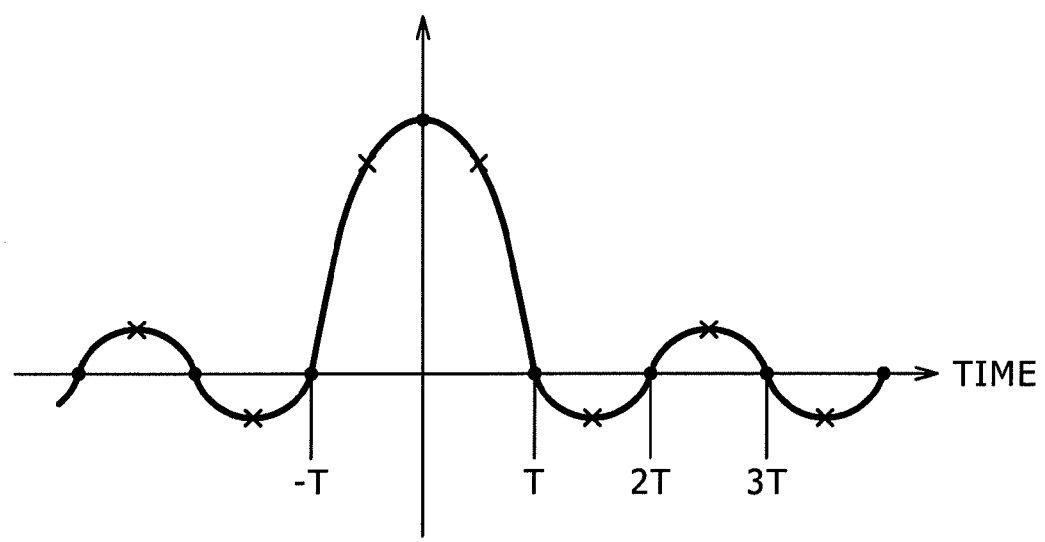
FIG. 9 is a view explanatory of a received signal.

Incidentally, as shown in FIG. 9, the received signal DT may be expressed as an imbrication of signals each given by displacing the unit pulse by n×T (n stands for an integer and T for the symbol period). That is, the symbol points are the points sampled at t=n×T as indicated by solid points in FIG. 9, and the intermediate points are the points sampled at t=n×T+T/2 as shown by crosses in FIG. 9.

Returning to FIG. 6, the waveform equalizer 53 is supplied with not only DT1, SEN1 and DEN1 coming from the sampling synchronizing section 52 but also SEL from the host CPU 43 connected to the I2CIF 55 by way of an I2C bus 44. Based on these data, the waveform equalizer 53 performs a waveform equalizing process on DT1 which is the received data before waveform equalization, to obtain DT2 which is the received data having undergone waveform equalization. The data DT2 is then fed to the error correcting section 54.

Here, SEL is a signal (timing signal) that causes the waveform equalizer 53 to select between the symbol rate equalizer function and the fractionally spaced equalizer function. Thus in response to the signal SEL from the host CPU 43, the waveform equalizer 53 operates either as a symbol rate equalizer or as a fractionally spaced equalizer. The waveform equalizer 53 is timed in operation by SEN1 from the sampling synchronizing section 52 when acting a symbol rate equalizer, or by DEN1 when acting as a fractionally spaced equalizer, before feeding the resulting DT2 to the error correcting section 54.

Other equalizer types that can be used as the waveform equalizer 53 include one whose filter coefficient is fixed (called the fixed coefficient equalizer hereunder) or one which has its own filter coefficient controlled adaptively while observing the received signal (called the adaptive equalizer hereunder). These equalizers will be discussed later in detail.

Meanwhile, the timing for selecting between the symbol rate equalizer and the fractionally spaced equalizer is determined illustratively by one the following three methods.

The first method involves using channel conditions. More specifically, the host CPU 43 may estimate channel error rate and, in order to minimize the estimated channel error rate, determine whether the symbol rate equalizer or the fractionally spaced equalizer is to be operated. Upon determining that the symbol rate equalizer is to be operated, the host CPU 43 outputs a High-level SEL signal to the waveform equalizer 53. On the other hand, upon determining that the fractionally spaced equalizer is to be operated, the host CPU 43 outputs a Low-level SEL signal to the waveform equalizer 53.

The second method involves using internal status of the waveform equalizer 53. More specifically, the host CPU 43 may detect an error signal inside the waveform equalizer 53 and, in order to minimize the detected error signal, determine whether the symbol rate equalizer or the fractionally spaced equalizer is to be operated. Depending on the result of the determination, the host CPU 43 outputs the High-level or Low-level signal to the waveform equalizer 53.

Further, the third method involves selecting the functionality of the waveform equalizer 53 acting either as the symbol rate equalizer or as the fractionally spaced equalizer in a particularly timed manner. More specifically, the host CPU 43 may first output the Low-level signal to the waveform equalizer 53 to operate it as the fractionally spaced equalizer. Thereafter, depending on the value of the filter coefficient in effect after the error signal (e.g., error signal inside the waveform equalizer 53) has settled, the host CPU 43 determines whether or not to operate the waveform equalizer 53 as the symbol rate equalizer. Upon determining that the waveform equalizer 53 is to be operated as the symbol rate equalizer, the host CPU 43 outputs the High-level signal to the waveform equalizer 53. The signal causes the waveform equalizer 53 to switch from the fractionally spaced equalizer to the symbol rate equalizer in functionality.

The above-described three methods are only examples whereby a selection is made between the symbol rate equalizer and the fractionally spaced equalizer. Obviously, the selection can be made between the symbol rate equalizer and the fractionally spaced equalizer in an otherwise timed manner to take into account their advantages and disadvantages.

In this embodiment, the SEL signal is described as being set by the host CPU 43, but obviously the SEL may be set by other methods as well. The point is that the waveform equalizer 53 should be given an instruction to select between the symbol rate equalizer and the fractionally spaced equalizer, by any means or method.

The error correcting section 54 is supplied with not only DT2 from the waveform equalizer 53 but also SEN2 which is a flag indicating that DT2 is at a symbol point. The reason the error correcting section 54 is not supplied with DEN2 which is a flag indicating DT2 is either at a symbol point or at an intermediate point between symbol points is that the data constituting the intermediate points between symbol points is not needed following the waveform equalizing process. Thus DEN2 is left open and only SEN2 is input to the downstream block.

Based on DT2 and SEN2 coming from the waveform equalizer 53, the error correcting section 54 performs a channel error removing process to obtain TS that is output outside the demodulating LSI 42.

In the demodulating LSI 42, as described above, the waveform equalizer 53 operates as the symbol rate equalizer given the timing of SEN1 from the sampling synchronizing section 52 or as the fractionally spaced equalizer given the timing of DEN1 also from the sampling synchronizing section 52.

Figure 11:
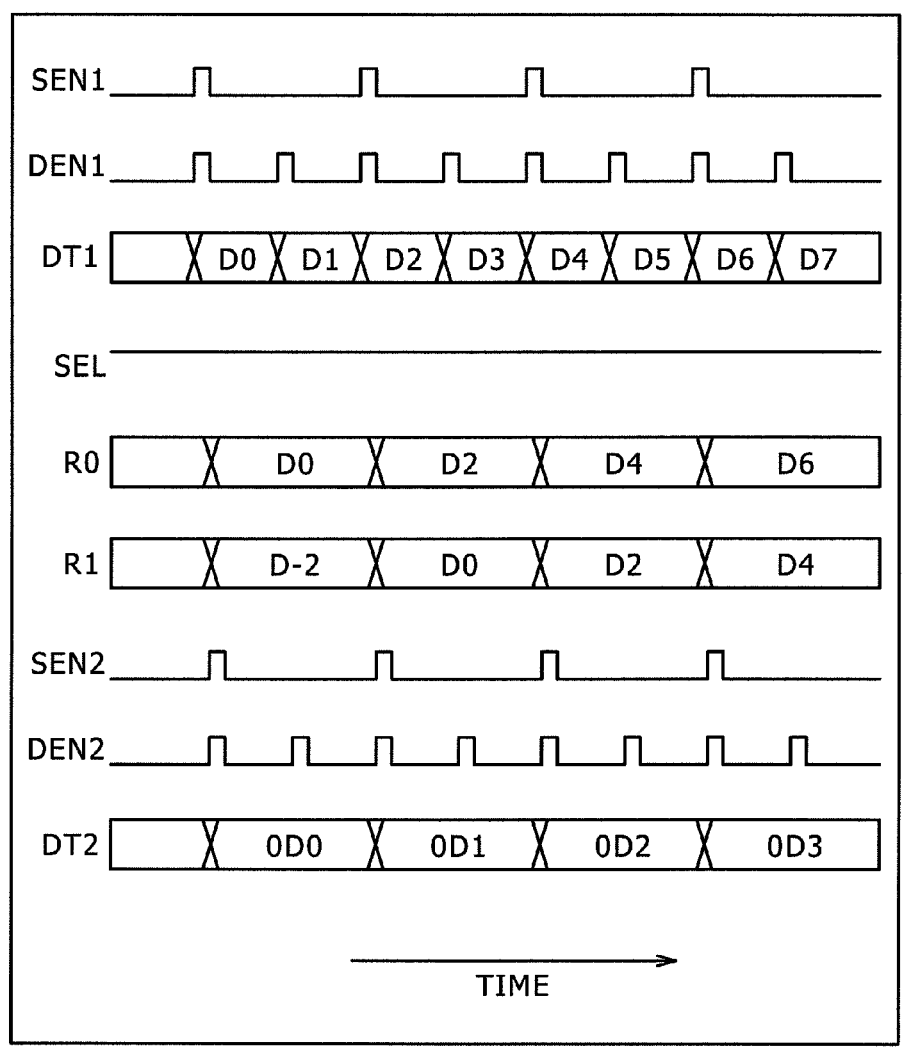
FIG. 11 is a timing chart explanatory of a fixed coefficient equalizer operating in symbol rate mode.
Figure 12:
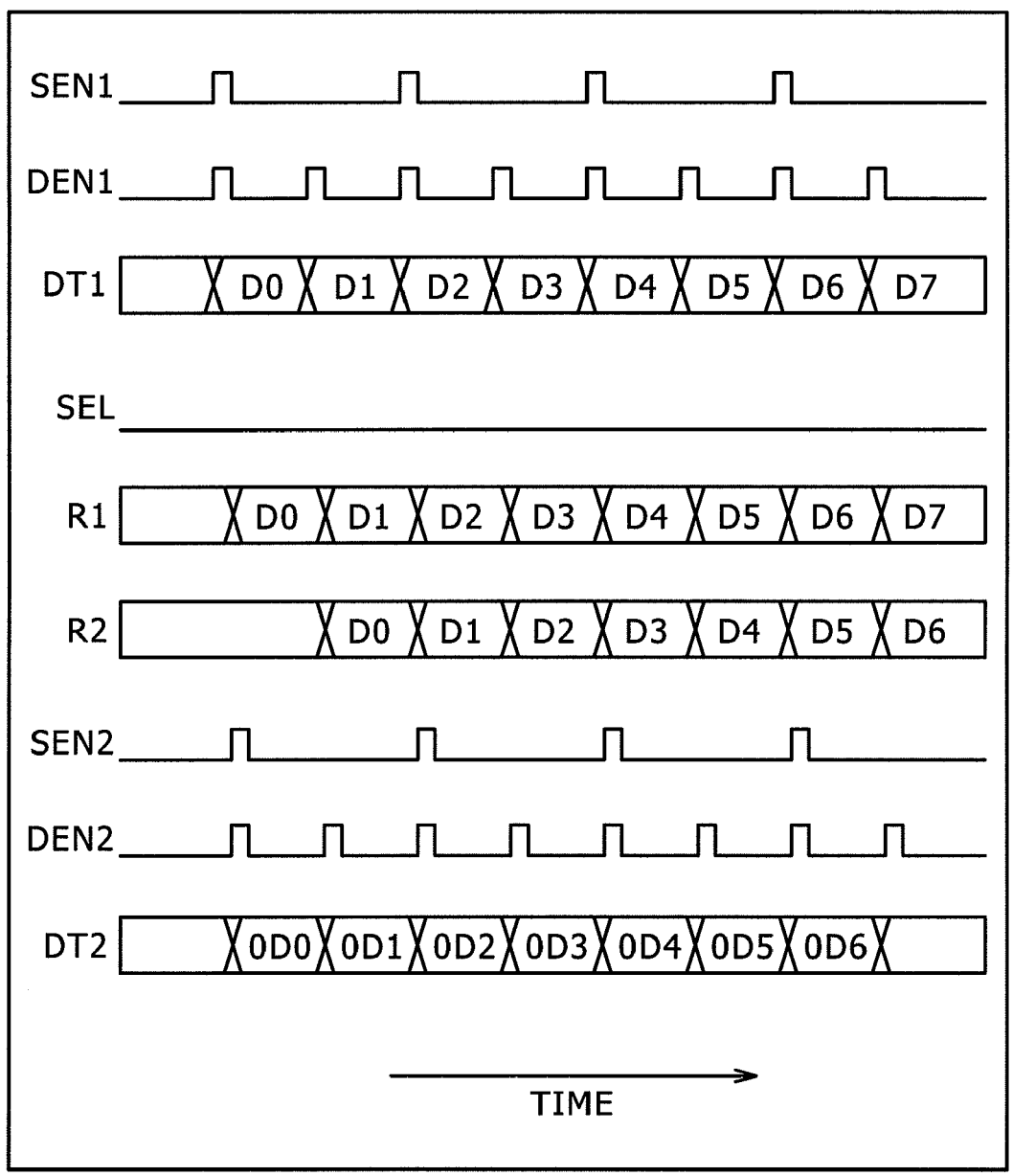
FIG. 12 is a timing chart explanatory of a fixed coefficient equalizer operating in fractionally spaced mode.

Meanwhile, as mentioned above, the waveform equalizer 53 may also be structured as a fixed coefficient equalizer or as an adaptive equalizer. What follows is a description of the waveform equalizer 53 structured as these equalizers. Described first in reference to FIGS. 10 through 12 is how the waveform equalizer 53 is operated illustratively as a fixed coefficient equalizer.

Figure 10:
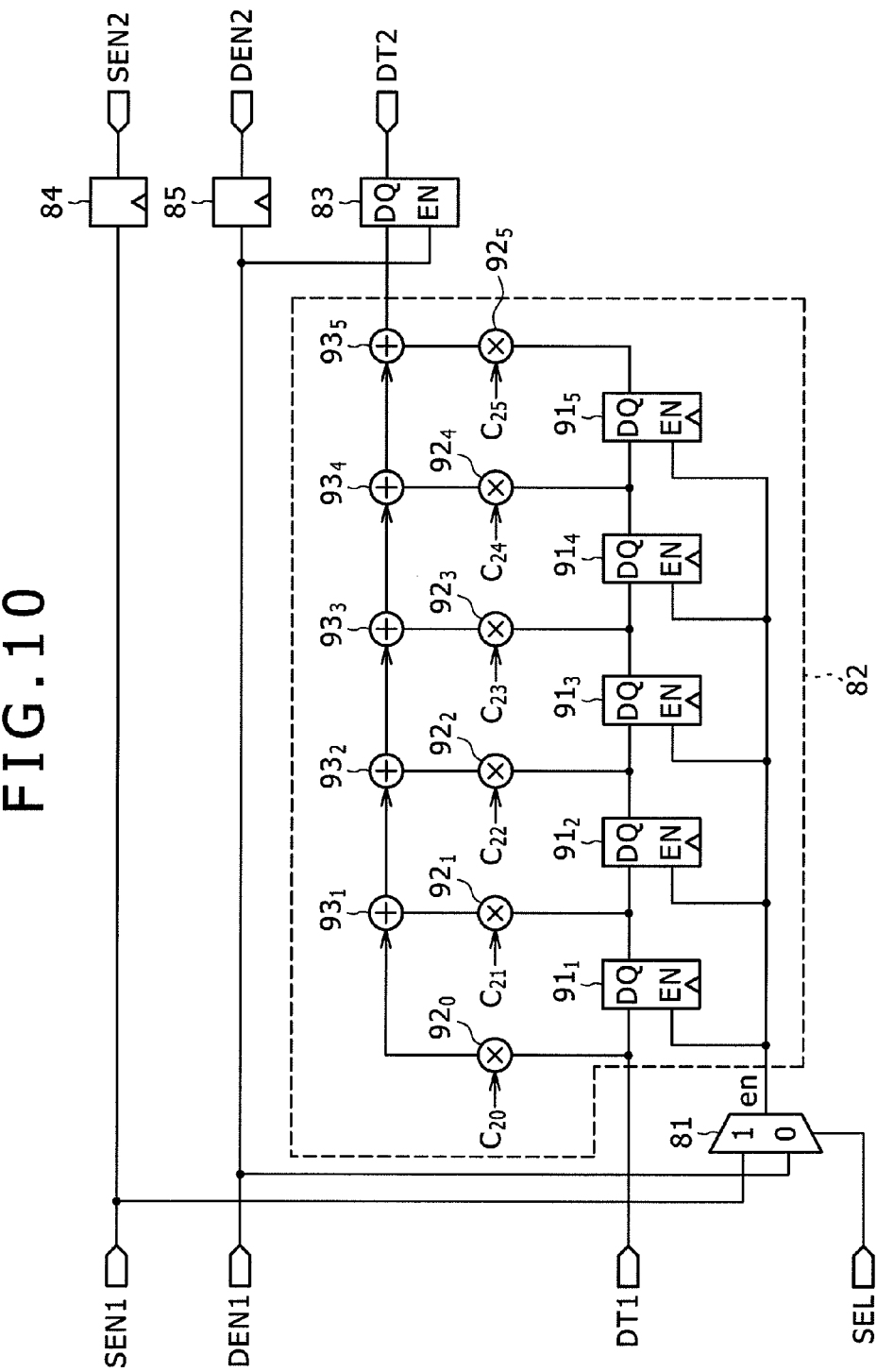
FIG. 10 is a circuit diagram explanatory of a detailed structure of a fixed coefficient equalizer.

FIG. 10 is a block diagram explanatory of a detailed structure of a fixed coefficient equalizer 71 as one variation of the waveform equalizer 53 in FIG. 6. The fixed coefficient equalizer 71 shown in FIG. 10 is a six-tap waveform equalizer with its filter coefficient fixed. Although the six-tap fixed coefficient equalizer 71 is explained here in connection with this embodiment as a typical fixed coefficient equalizer, this is only an example; a fixed coefficient equalizer having other than six taps may also be used instead.

The fixed coefficient equalizer 71 in FIG. 10, which corresponds to the waveform equalizer 53 in FIG. 6, inputs DT1, SEN1 and DEN1 from the sampling synchronizing section 52 and SEL from the host CPU 43. The fixed coefficient equalizer 71 performs the waveform equalizing process based on these signals and outputs DT2, SEN2 and DEN2 derived from the process.

The fixed coefficient equalizer 71 is structured to include a selector 81, a filter 82, a register 83, a register 84, and a register 85. Incorporated in the six-tap waveform equalizer, the filter 82 is furnished with registers $91_1$ through $91_5$ which hold DT1 for a predetermined period each before output, multipliers $92_0$ through $92_5$ which multiply DT1 delayed by the registers $91_1$ through $91_5$ each by filter coefficients $C_{20}$ through $C_{25}$ respectively, and adders $93_1$ through $93_5$ which add up the products from the multipliers $92_0$ through $92_5$.

The elements above are explained hereunder, in no particular order. SEN1, DEN1 and SEL are input to the selector 81. If the input SEL represents 1, that means the equalizer operates as the symbol rate equalizer. Then the selector 81 selects SEN1 as en and outputs what is selected to the registers $91_1$ through $91_5$.

When en goes High, i.e., at intervals of a symbol period, the register $91_1$ outputs the input DT1 to the register $91_2$. Likewise, each of the registers $91_2$ through $91_5$ forwards the output from the preceding register to the immediately subsequent register per symbol period. That is, the input DT1 is shifted per symbol period from the register $91_1$ to the register $91_2$ to the register $91_3$ to the register $91_4$ to the register $91_5$, in that order.

Also, the multiplier $92_0$ multiplies DT1 by the filter coefficient $C_{20}$ and outputs the product to the adder $93_1$. The adder $93_1$ adds up the output from the multiplier $92_0$ and the output from the multiplier $92_1$ (i.e., product of the multiplication of DT1 delayed by the register $91_1$, by the filter coefficient $C_{21}$), and outputs the sum to the adder $93_2$. Likewise, each of the adders $93_2$ through $93_5$ proceeds to add up the sum from the preceding adder and the product input from the corresponding multiplier, and outputs the sum to the immediately subsequent adder.

As explained above, when the fixed coefficient equalizer 71 of FIG. 10 operates as the symbol rate equalizer because the input SEL is 1, the product-sum operations carried out on DT1 and on the outputs from the registers $91_1$ through $91_5$ as well as on the filter coefficients $C_{20}$ through $C_{25}$ at the timing of SEN1 (i.e., per symbol period) results in a waveform-equalized output signal DT2 that is output.

On the other hand, if the input SEL represents 0, then the equalizer operates as the fractionally spaced equalizer. Then the selector 81 selects DEN1 as en and outputs what is selected to the registers $91_1$ through $91_5$.

When en goes High, i.e., at intervals of a half symbol period, each of the registers $91_1$ through $91_5$ forwards the output from the preceding register to the immediately subsequent register. That is, the input DT1 is shifted per half symbol period from the register $91_1$ to the register $91_2$ to the register $91_3$ to the register $91_4$ to the register $91_5$, in that order.

As in the above-described case of the equalizer acting as the symbol rate equalizer, each of the adders $93_1$ through $93_5$ proceeds to add up the sum from the preceding adder and the product input from the corresponding multiplier, and outputs the sum to the immediately subsequent adder.

As explained above, when the fixed coefficient equalizer 71 of FIG. 10 operates as the fractionally spaced equalizer because the input SEL is 0, the product-sum operations carried out on DT1 and on the outputs from the registers $91_1$ through $91_5$ as well as on the filter coefficients $C_{20}$ through $C_{25}$ at the timing of DEN1 (i.e., per half symbol period) result in a waveform-equalized output signal DT2 that is output.

The result of the product-sum operations is input from the adder $93_5$ to the register 83. The register 83 outputs as DT2 the result of the product-sum operations held therein, at the timing of DEN1 (i.e., per half symbol period).

The register 84 holds SEN1 and delays it by one clock pulse before outputting it as SEN2. The register 85 holds DEN1 and delays it by one clock pulse before outputting it as DEN2. That is, the fixed coefficient equalizer 71 delays SEN1 and DEN1 by one clock pulse each before outputting them as SEN2 and DEN2, respectively.

The fixed coefficient equalizer 71 is selectively controlled in response to the SEL signal as described above, so as to operate either as the symbol rate equalizer or as the fractionally spaced equalizer. In the ensuing description, the mode in which the fixed coefficient equalizer 71 operates as the symbol rate equalizer will be called symbol rate mode, and the mode in which the fixed coefficient equalizer operates as the fractionally spaced equalizer will be referred to as fractionally spaced mode.

Described below in reference to the timing chart of FIG. 11 is the fixed coefficient equalizer 71 operating in symbol rate mode.

In FIG. 11, the timings of SEN1, DEN1, DT1, SEL, R0, R1, SEN2, DEN2 and DT2 are shown from the top down in chart form.

Since in FIG. 11 the timings before and after the registers acting as shift registers need only be known, FIG. 11 shows the timing chart of registers R0 and R1 indicating the timings before and after each of the registers $91_1$ through $91_5$ in FIG. 10. Thus the timing chart of the registers R0 and R1 corresponds illustratively to the timing chart of the registers $91_1$ and $91_2$ in FIG. 10.

As explained above in connection with FIG. 7, the level of SEN1 goes High at intervals of the symbol period of DT1, and the level of DEN1 goes High at intervals of half the symbol period of DT1.

When the fixed coefficient equalizer 71 is made to operate in symbol rate mode, the level of SEL input to the selector 81 is brought High. The register R0 shifts and holds DT1 at the timing of SEN1, i.e., per symbol period, since the level of SEL is kept High in symbol rate mode. Likewise the register R1 shifts and holds DT1 per symbol period.

More specifically, if the register R0 holds D0 illustratively at a given time t0, then the register R1 holds D-2 which precedes D0 by one symbol period. Thereafter, at a time t2 subsequent to the time T0 by one symbol period, the register R0 shifts D0 held therein to hold D2; the register R1 shifts D-2 held therein to hold D0.

The above operations are repeated so that when each of the times t0, t2, t4, t6, . . . , is reached one after another, the register R0 holds D0, D2, D4, D6, . . . , one after another. The register R1 holds one after another D-2, D0, D2, D4, . . . , which precede by one symbol period each the data held in the register R1.

That is, although not shown, the relationship between the register R0 and the register R1 in FIG. 11 may be applied to the registers $91_1$ through $91_5$ in FIG. 10 as follows: when each of the times t0, t2, t4, t6, . . . , is reached one after another, the register $91_1$ holds D0, D2, D4, D6, . . . , one after another; the register $91_2$ holds one after another D-2, D0, D2, D4, . . . , which precede by one symbol period each the data held in the register $91_1$. Likewise, the register $91_3$ holds D-4, D-2, D0, D2, . . . ; the register $91_4$ holds D-6, D-4, D-2, D0, . . . ; and the register $91_5$ holds D-8, D-6, D-4, D-2, . . . one after another.

When the registers $91_1$ through $91_5$ shift their data at the timing of SEN1 as described above, the product-sum operations subsequent to the registers $91_1$ through $91_5$ are carried out on every other input data item and on the filter coefficient.

Then the result of the product-sum operations is held in the register 83 and output as DT2 at the timing of DEN1. That is, as shown in FIG. 11, OD0, OD1, OD2, OD3, . . . resulting from the product-sum operations on DT1, on the outputs from the registers $91_1$ through $91_5$, and on the filter coefficients $C_{20}$ through $C_{25}$ are output at the timing of DEN1.

In addition, SEN1 that was input is delayed by one clock pulse by the register 84 before being output as SEN2. Likewise, DEN1 that was input is delayed by one clock pulse by the register 85 before being output as DEN2.

In the manner described above, the fixed coefficient equalizer 71 operates in symbol rate mode.

Described below in reference to the timing chart of FIG. 12 is the fixed coefficient equalizer 71 operating in fractionally spaced mode.

In FIG. 12, as in FIG. 11, the timings of SEN1, DEN1, DT1, SEL, R0, R1, SEN2, DEN2 and DT2 are shown from the top down in chart form.

Since in FIG. 12 the timings before and after the registers acting as shift registers need only be known, FIG. 12 shows the timing chart of registers R1 and R2 indicating the timings before and after each of the registers $91_1$ through $91_5$ in FIG. 10. Thus the timing chart of the registers R1 and R2 corresponds illustratively to the timing chart of the registers $91_1$ and $91_2$ in FIG. 10.

Also, the portions in FIG. 12 which correspond to those in the timing chart of FIG. 11 and which are thus repetitive will not be discussed further hereunder where appropriate.

When the fixed coefficient equalizer 71 is made to operate in fractionally spaced mode, the level of SEL input to the selector 81 is brought Low. The register R1 shifts and holds DT1 at the timing of DEN1, i.e., per half symbol period, since the level of SEL is kept Low in fractionally spaced mode. Likewise the register R2 shifts and holds DT1 per half symbol period.

That is, whereas DT1 is shifted and held per symbol period when the fixed coefficient equalizer 71 is made to operate in symbol rate mode, DT1 is shifted and held per half symbol period when the fixed coefficient equalizer 71 is made to operate in fractionally spaced mode. Thus when each of the times t0, t1, t2, t3, t4, t5, t6, . . . is reached one after another (i.e., at intervals of a half symbol period), the register R1 holds D0, D1, D2, D3, D4, D5, D6, D7, . . . , one after another; the register R2 holds D-1 (not shown), D0, D1, D2, D3, D4, D5, D6, . . . , one after another.

That is, although not shown, the relationship between the register R1 and the register R2 in FIG. 12 may be applied to the registers $91_1$ through $91_5$ in FIG. 10 as follows: when each of the times t0, t1, t2, t3, t4, t5, t6, . . . , is reached one after another (i.e., at intervals of a half symbol period), the register $91_1$ holds D0, D1, D2, D3, D4, D5, D6, D7, . . . , one after another; the register $91_2$ holds one after another D-1, D0, D1, D2, D3, D4, D5, D6, . . . , which precede by half the symbol period each the data held in the register $91_1$. Likewise, the register $91_3$ holds D-2, D-1, D0, D1, D2, D3, D4, D5, . . . ; the register $91_4$ holds D-3, D-2, D-1, D0, D1, D2, D3, D4, . . . ; and the register $91_5$ holds D-4, D-3, D-2, D-1, D0, D1, D2, D3, . . . one after another.

When the registers $91_1$ through $91_5$ shift and hold their data at the timing of DEN1 as described above, the product-sum operations subsequent to the registers $91_1$ through $91_5$ are carried out on the consecutively input data and on the filter coefficient.

Then the result of the product-sum operations is held in the register 83 and output as DT2 at the timing of DEN1. That is, as shown in FIG. 12, OD0, OD1, OD2, OD3, OD4, OD5, OD6, . . . resulting from the product-sum operations on DT1, on the outputs from the registers $91_1$ through $91_5$, and on the filter coefficients $C_{20}$ through $C_{25}$ are output at the timing of DEN1.

In the manner described above, the fixed coefficient equalizer 71 operates in fractionally spaced mode.

As explained, the fixed coefficient equalizer 71 does not incorporate two waveform equalizers and select between the two equalizers. Instead, the fixed coefficient equalizer 71 incorporates a single waveform equalizer that is controlled to select between symbol rate mode and fractionally spaced mode. This makes it possible to switch the waveform equalizer between different operation rates while having the circuit resources such as registers and product-sum operation circuits shared between the switched rates.

Also, in keeping with the channel to be equalized, either symbol rate mode or fractionally spaced mode can be selected freely, so that higher receiving characteristics are made available than before.

Described below in reference to FIGS. 13 through 16 is an example of operating the waveform equalizer 53 as an adaptive equalizer, but before the description of the equalizer workings, the principle of adaptive equalization will be explained.

The adaptive equalizer is a waveform equalizer used for channels of which the filter coefficient with regard to a given waveform equalizer cannot be determined beforehand. The adaptive equalizer controls its own filter coefficient adaptively while monitoring the received signal.

Incidentally, the expression (1) shown below is the expression of principle (filter coefficient updating expression) of the adaptive equalizer. The expression (1) gives the principle of signed LMS (Least Mean Square) for the adaptive equalizer. That is, the LMS algorithm is one example of adaptive equalization algorithm.

[Expression 1]

$$C_{n+1}{}^i = C_n{}^i + \lambda \cdot [X_n{}^i] e_n \qquad (1)$$

In the expression (1) above, [a]=1 when a>0, [a]=0 when a=0, and [a]=−1 when a<0.

In the expression (1), reference character i stands for a tap number, n for a time index, $\lambda$ for a coefficient, and $X_n{}^i$ for the value at the time n and tap number i. Furthermore, reference character $e_n$ denotes the signal called the error signal in effect at the time n and represents equalization error. The adaptive equalizer exercises control in a manner minimizing the error signal $e_n$ while updating the filter coefficient.

The error signal $e_n$ represents the difference between the output signal of the waveform equalizer and the point of transmission as the source of that signal, and is given by the following expression:

$$e_n = Z_n - d_n \qquad (2)$$

In the expression (2) above, $Z_n$ denotes the output of the waveform equalizer (i.e., DT2 above), and $d_n$ represents the estimated value of a transmitted symbol.

Also, $Z_n$ is given by the following expression:

$$Z_n = \Sigma C_n \times X_n \qquad (3)$$

There exist a number of techniques for estimating the point of transmission $d_n$ as the source of the output signal of the waveform equalizer. Of these techniques, two will be explained below for illustration.

The first technique involves transmitting a fixed sequence for equalization purposes. According to this technique, the transmitting side transmits the fixed sequence at intervals of a transmission frame. When the receiving side determines the transmission frame and the position of the fixed sequence, the receiving side can determine the transmitted signal as the source in that fixed sequence interval alone.

Figure 13:
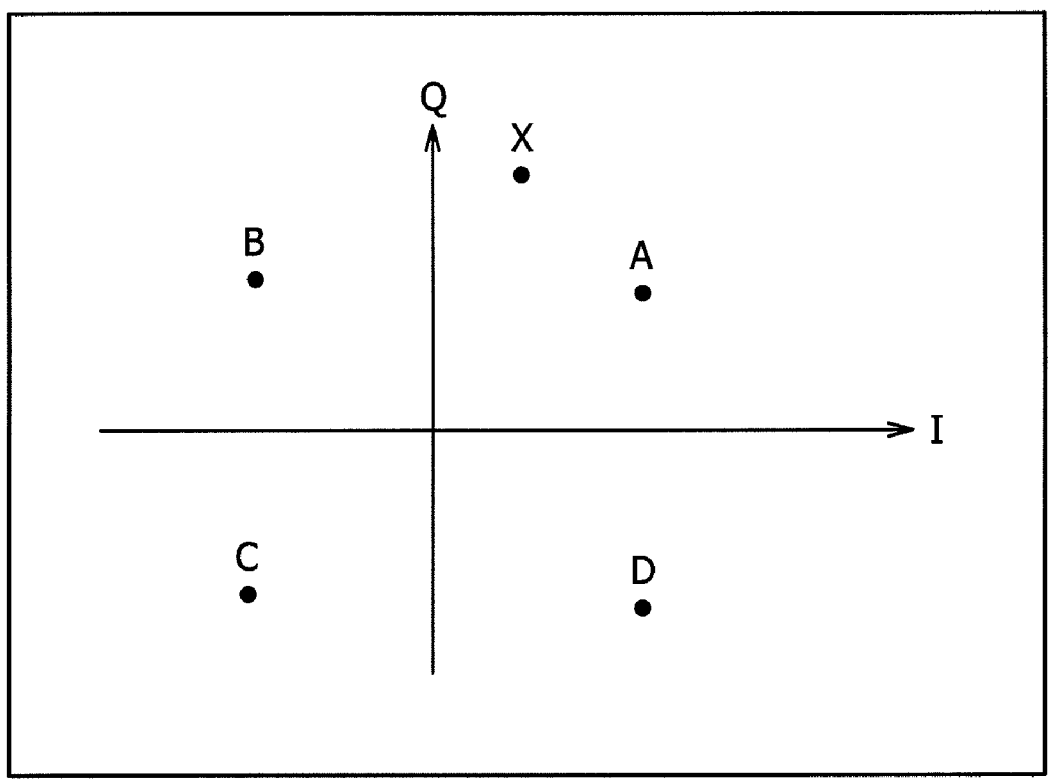
FIG. 13 is a view explanatory of a method for estimating points of transmission as the source of an output signal of a waveform equalizer.

The second technique involves assuming the signal point closest to the equalized signal point as the point of transmission. Illustratively in the case of QPSK (Quadrature Phase Shift Keying), according to this technique, one of four points A, B, C and D shown in FIG. 13 constitutes the point of transmission. If a point X on the IQ plane is assumed to be received as shown in FIG. 13, then the point A closest to that point X is estimated to have been transmitted and the point X to have been received.

These techniques are used to acquire the estimated value of the transmitted symbol.

As for the updating of the filter coefficient, processing is carried out only on the signal of the symbol point regardless of the symbol rate equalizer or fractionally spaced equalizer being in operation.

The principle of adaptive equalization has been explained so far. It should be noted, however, that attempts to install the equalizer into actual circuits often fail to bring about an installation that satisfies the expression of the principle of adaptive equalization. The principal reason for this trouble is that it takes time to compute the error signal, which in turn prolongs feedback.

Thus the following expression is often used in practice as the filter coefficient updating expression:

[Expression 2]

$$C_{n+1}{}^i = C_n{}^i + \lambda \cdot [X_{n-N}{}^i] e_{n-N} \quad (4)$$

In the expression (4) above, N stands for a circuit delay.

That is, the expression (4) utilizes the coefficient at a time n and the error signal at a time n-N in order to compute the coefficient at a time n+1.

Incidentally, the expression (4) as the filter coefficient updating expression allows for a delay of N clock pulses in error computations. The N-clock-pulse delay is applied likewise to the tap $X_n$ to be multiplied by en. This is because the error signal en and the delay at the tap $X_n$ need to be aligned precisely with one another so as to accomplish correct equalization.

The principle of adaptive equalization was described above. Explained next is the adaptive equalizer carrying out filter coefficient updates using the circuits applicable to the expression (4). In describing this embodiment, it is assumed that a d−1 clock pulse delay is involved in the computations performed by these circuits.

Figure 14:
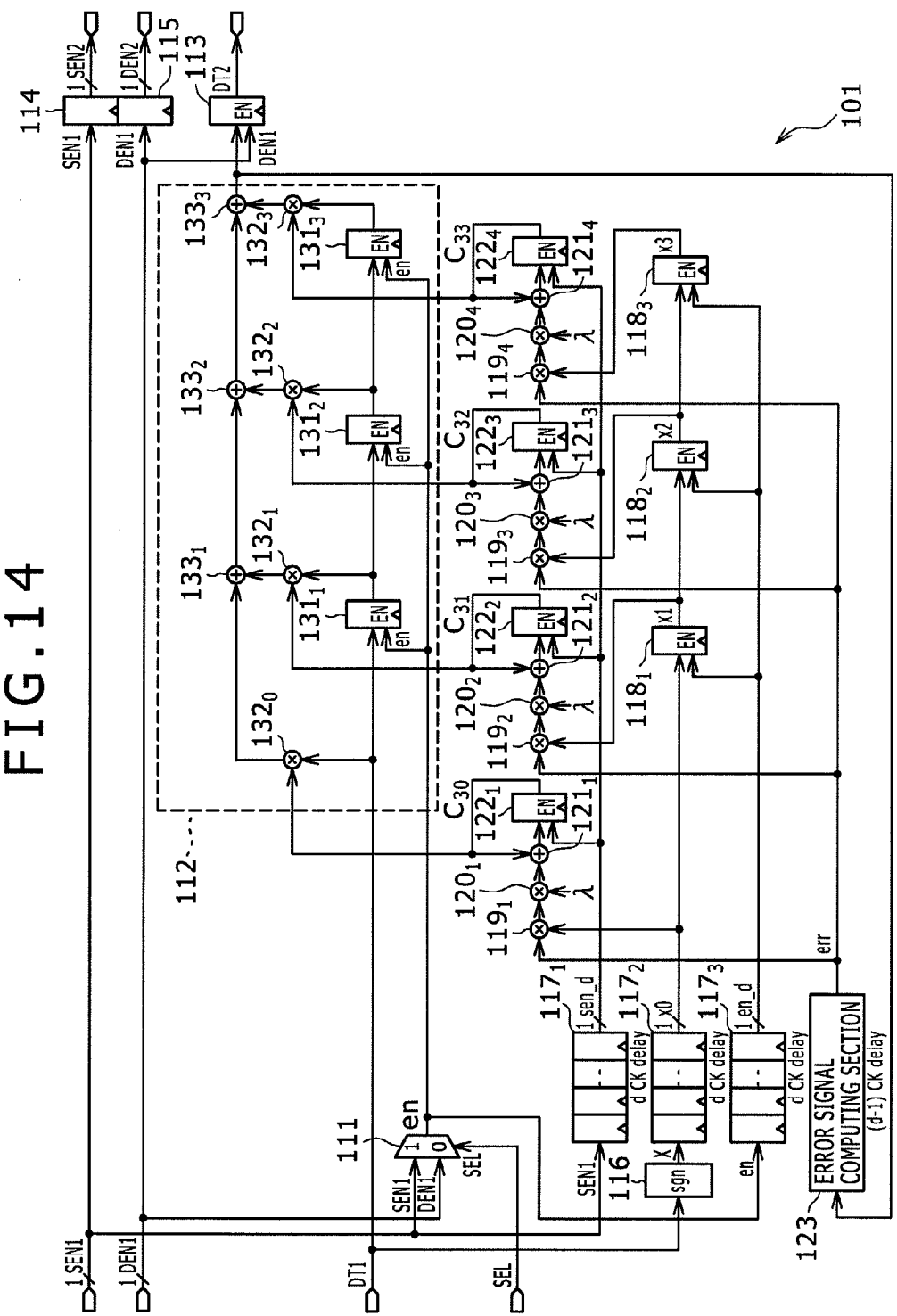
FIG. 14 is a circuit diagram explanatory of a detailed structure of an adaptive equalizer.

FIG. 14 is a block diagram explanatory of a detailed structure of an adaptive equalizer 101 as a variation of the waveform equalizer 53 in FIG. 6. The adaptive equalizer 101 in FIG. 14 is a four-tap waveform equalizer that exemplifies the waveform equalizer controlling its filter coefficient adaptively. Although the four-tap adaptive equalizer 101 is explained below as a typical adaptive equalizer for this embodiment, obviously an adaptive equalizer having other than four taps is also acceptable.

Because the adaptive equalizer 101 in FIG. 14 corresponds to the waveform equalizer 53 in FIG. 6, DT1, SEN1 and DEN1 are input from the sampling synchronizing section 52 and SEL is input from the host CPU 43. Based on these signals, the adaptive equalizer 101 performs the waveform equalizing process and outputs DT2, SEN2 and DEN2 acquired through the process.

In the adaptive equalizer 101, a selector 111, a register 113, a register 114, and a register 115 correspond to the selector 81, register 83, register 84, and register 85 respectively in the fixed coefficient equalizer 71 of FIG. 10.

Although they have a different number of taps each, the filter 112 and the filter 82 in FIG. 10 have basically the same structure: registers $131_1$ through $131_3$, multipliers $132_0$ through $132_3$, and adders $133_1$ through $133_3$ correspond to the registers $91_1$ through $91_5$, multipliers $92_0$ through $92_5$, and adders $93_1$ through $93_5$ respectively in FIG. 10. It should be noted that the adaptive equalizer 101 of FIG. 14 has its filter coefficient updated adaptively. Thus whereas the multipliers $92_0$ through $92_5$ in FIG. 10 use the fixed filter coefficients $C_{20}$ through $C_{25}$ in their multiplications, the multipliers $132_0$ through $132_3$, in FIG. 14 use adaptively updated filter coefficients $C_{30}$ through $C_{33}$ in their multiplications.

That is, although the adaptive equalizer 101 in FIG. 14 has basically the same structure as the fixed coefficient equalizer 71 in FIG. 10, the adaptive equalizer 101 is different from its counterpart 71 in FIG. 10 in that it has another downstream block for adaptively controlling the filter coefficients ($C_{30}$, $C_{31}$, $C_{32}$, $C_{33}$ in FIG. 14) in keeping with the received signal.

Specifically, the adaptive equalizer 101 is structured further to include an arithmetic unit 116, delay circuits $117_1$ through $117_3$, registers $118_1$ through $118_3$, multipliers $119_1$ through $119_4$, multipliers $120_1$ through $120_4$, adders $121_1$ through $121_4$, registers $122_1$ through $122_4$, and an error signal computing section 123.

Thus the portions of the adaptive equalizer 101 in FIG. 14 which correspond to those of the fixed coefficient equalizer 71 in FIG. 10 are repetitive and will not be discussed further hereunder where appropriate. The description below will center on the method for adaptively controlling the filter coefficients $C_{30}$ through $C_{33}$ to be multiplied by the multipliers $132_0$ through $132_3$ with the outputs from DT1 and the registers $131_1$ through $131_3$.

The elements above are explained hereunder, in no particular order. DT1 is input to the arithmetic unit 116. The arithmetic unit 116 performs operations involving the so-called sgn function and returns an integer (i.e., return value) indicating the sign of the number designated as an argument. That is, the arithmetic unit 116 carries out the operations corresponding to $[X_{n-N}{}^i]$ in the above-mentioned expression (4). The arithmetic unit 116 outputs the value x acquired through the operations to the delay circuit $117_2$.

Symbol SEN1 is input to the delay circuit $117_1$. The delay circuit 117 acquires sen_d by delaying SEN1 by d clock pulses and outputs sen_d to the registers $122_1$ through $122_4$.

The value x is input to the delay circuit $117_2$ from the arithmetic unit 116. The delay circuit $117_2$ acquires x0 by delaying x by d clock pulses and outputs x0 to the register $118_1$ and multiplier $119_1$.

The value en is input to the delay circuit $117_3$ from the selector 111. The delay circuit $117_3$ acquires en_d by delaying en by d clock pulses and outputs en_d to the registers $118_1$ through $118_3$.

The value x0 from the delay circuit $117_2$ and en_d from the delay circuit $117_3$ are input to the register $118_1$. The register $118_1$ turns x0 held therein into x1 when en_d goes High, and outputs x1 to the register $118_2$ and multiplier $119_2$.

When en_d goes High, the value x2 acquired by the register $118_2$ delaying x1 is output likewise to the register $118_3$ and multiplier $119_3$; the value x3 acquired by the register $118_3$ delaying x2 is output likewise to the multiplier $119_4$.

The result of the product-sum operations is input to the error signal computing section 123 from the adder $133_3$. The error signal computing section 123 computes the error signal using the result of the product-sum operations and outputs what is computed to the multipliers $119_1$ through $119_4$.

The value x0 from the delay circuit $117_2$ and err from the error signal computing section 123 are input to the multiplier $119_1$. The multiplier $119_1$ multiplies x0 by err and outputs the product to the multiplier $120_1$.

The output value from the multiplier $119_1$ (i.e., product of x0 and err) and the coefficient λ are input to the multiplier $120_1$. The multiplier $120_1$ multiplies the output value by the coefficient λ and outputs the product to the adder $121_1$.

The output value from the multiplier $120_1$ (product of x0, error, and coefficient λ) and the filter coefficient $C_{30}$ from the downstream register $122_1$ are input to the adder $121_1$. The adder $121_1$ adds the output value from the multiplier $120_1$ to the filter coefficient $C_{30}$ from the register $122_1$ and outputs the sum to the register $122_1$.

The output value from the adder $121_1$ (sum of the filter coefficient $C_{30}$ and the product of x0, err and coefficient λ) and sen_d from the delay circuit $117_1$ are input to the register $122_1$. When sen_d goes High, the register $122_1$ turns the retained output value from the adder $121_1$ into the filter coefficient $C_{30}$ and outputs the filter coefficient $C_{30}$ to the multiplier $132_0$ and adder $121_1$.

Here, the value held in the register $122_1$ is acquired through computations that utilize the expression (4) described above in conjunction with the principle of adaptive equalization.

That is, the multiplier $119_1$ computes $[X_{n-N}{}^i] \times e_{n-N}$, the multiplier $120_1$ computes $\lambda \times [X_{n-N}{}^i] \times e_{n-N}$, and the adder $121_1$ computes $C_n{}^i + \lambda \times [X_{n-N}{}^i] \times e_{n-N}$, whereby the computations corresponding to the expression (4) are carried out. The register $122_1$ outputs $C_{n+1}{}^i$ acquired through the computations corresponding to the expression (4), to the multiplier $132_0$ and adder $121_1$. Thereafter, the multiplier $132_0$ multiplies $C_{n+1}{}^i$ by DT1, and the adder $121_1$ computes $C_{n+2}{}^i$ using $C_{n+1}{}^i$.

As with the multiplier $119_1$ through the register $122_1$, the multiplier $119_2$ through the register $122_2$, the multiplier $119_3$ through the register $122_3$, and the multiplier $119_4$ through the register $122_4$ carry out the computations corresponding to the expression (4). The filter coefficients $C_{31}$ through $C_{33}$ acquired through the computations are output to the multipliers $132_1$ through $132_3$ respectively, and are multiplied by the outputs from the registers $131_1$ through $131_3$ respectively.

As described above, the adaptively acquired filter coefficients $C_{30}$ through $C_{33}$ are input to the multipliers $132_0$ through $132_3$. The multipliers $132_0$ through $132_3$ perform computations multiplying these filter coefficients by DT1 and by the outputs from the registers $131_1$ through $131_3$.

In other words, in the adaptive equalizer 101 of FIG. 14, the error signal computing section 123 generates the error signal based on the result of the product-sum operations coming from the adder $133_3$. The values x0, x1, x2 and x3 each delayed by the same amount as the error signal thus generated are used to perform the filter coefficient updating computations of the expression (4), whereby the filter coefficients $C_{31}$ through $C_{33}$ are updated.

As with the fixed coefficient equalizer 71 of FIG. 10, when the adaptive equalizer 101 of FIG. 14 structured as described above operates as the symbol rate equalizer because SEL input to the selector 111 is 1, a waveform-equalized output signal DT2 is output at the timing of SEN1 (i.e., per symbol period) as representative of the result of the product-sum operations that utilize the adaptively controlled filter coefficients $C_{30}$ through $C_{33}$.

Also, when the adaptive equalizer 101 of FIG. 14 operates as the fractionally spaced equalizer because SEL input to the selector 111 is 0, a waveform-equalized output signal DT2 is output at the timing of DEN1 (i.e., per half symbol period) as representative of the result of the product-sum operations that utilize the adaptively controlled filter coefficients $C_{30}$ through $C_{33}$.

When thus controlled selectively in keeping with SEL, the adaptive equalizer 101 operates either as the symbol rate equalizer or as the fractionally spaced equalizer.

Figure 15:
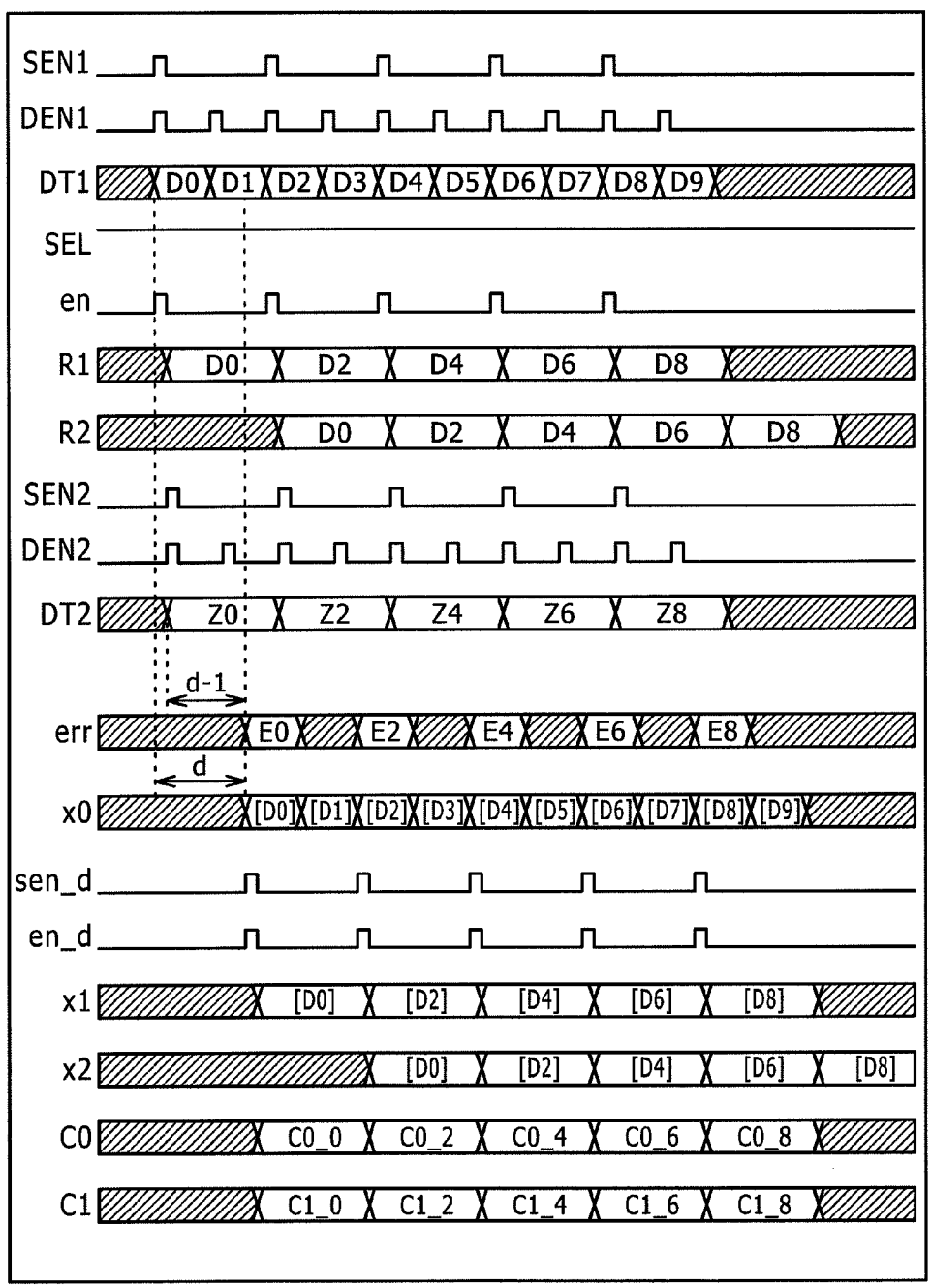
FIG. 15 is a timing chart explanatory of an adaptive equalizer operating in symbol rate mode.

Described below in reference to the timing chart of FIG. 15 is the adaptive equalizer 101 operating in symbol rate mode.

In FIG. 15, the timings of SEN1, DEN1, DT1, SEL, en, R1, R2, SEN2, DEN2, DT2, err, x0, sen_d, en_d, x1, x2, C0, and C1 are shown from the top down in chart form.

Since in FIG. 15 the timings before and after the registers acting as shift registers need only be known, FIG. 15 shows the timing chart of the registers R1 and R2 corresponding to the registers $131_1$ through $131_3$ in FIG. 14. The timing chart of x0 corresponds to the output from the delay circuit $117_2$ in FIG. 14; the timing chart of x1 and x2 corresponds to the outputs from the registers $118_1$ through $118_3$ in FIG. 14; the timing chart of C0 and C1 corresponds to the filter coefficients $C_{30}$ through $C_{33}$ in FIG. 14. These relationships also hold in the timing chart of FIG. 16, to be discussed later.

As described above, the level of SEN1 goes High at intervals of the symbol period of DT1; the level of DEN1 goes High at intervals of half the symbol period of DT1.

When the adaptive equalizer 101 is made to operate in symbol rate mode, the level of SEL input to the selector 111 is brought High. The level of en goes High per symbol period in keeping with SEN1.

Since the level of SEL is kept High in symbol rate mode, R1 and R2 are shifted at the timing of SEN1, i.e., per symbol rate.

In this manner, the registers $131_1$ through $131_3$ shift and hold their data at the timing of SEN1. Thus the product-sum operations subsequent to the registers $131_1$ through $131_3$ are performed on every other input data item and on the filter coefficient.

The result of the product-sum operations is held in the register 113 and output as DT2 at the timing of DEN1. That is, Z0, Z2, Z4, Z6, Z8, . . . resulting from the product-sum operations performed on DT1 and on the outputs from the registers $131_1$ through $131_3$ as well as on the filter coefficients $C_{30}$ through $C_{33}$ are output at the timing of DEN1.

Incidentally, the adaptive equalizer 101 in FIG. 14 is assumed to have the delay of d−1 clock pulses as mentioned above. Thus as shown in FIG. 15, using Z0 resulting from the product-sum operation on DT2, the error signal computing section 123 illustratively computes E0 delayed by d−1 clock pulses relative to Z0 as err. The delay circuit $117_2$ delays D0 by d clock pulses to attain synchronism with E0.

Likewise, the delay circuit $117_1$ delays SEN1 by d clock pulses, and the delay circuit $117_3$ delays en by d clock pulses. That is, the levels of sen_d and en_d having been delayed are brought High when SEN1 and en are delayed by d clock pulses each.

The registers $118_1$ through $118_3$ shift and hold their data at the timing of en_d. Thus the operations subsequent to the registers $118_1$ through $118_3$ are performed on every other input data item such as D0, D2, D4, D6, D8, . . . .

Also, the registers $122_1$ through $122_4$ shift their retained data at the timing of sen_d. This causes the filter coefficient C0 to be output at the timing of sen_d such as C0_0, C0_2, C0_4, C0_6, C0_8, . . . . Likewise the filter coefficient C1 is output at the timing of sen_d such as C1_0, C1_2, C1_4, C1_6, C1_8, . . . .

In the manner described above, the adaptive equalizer 101 operates in symbol rate mode.

Figure 16:
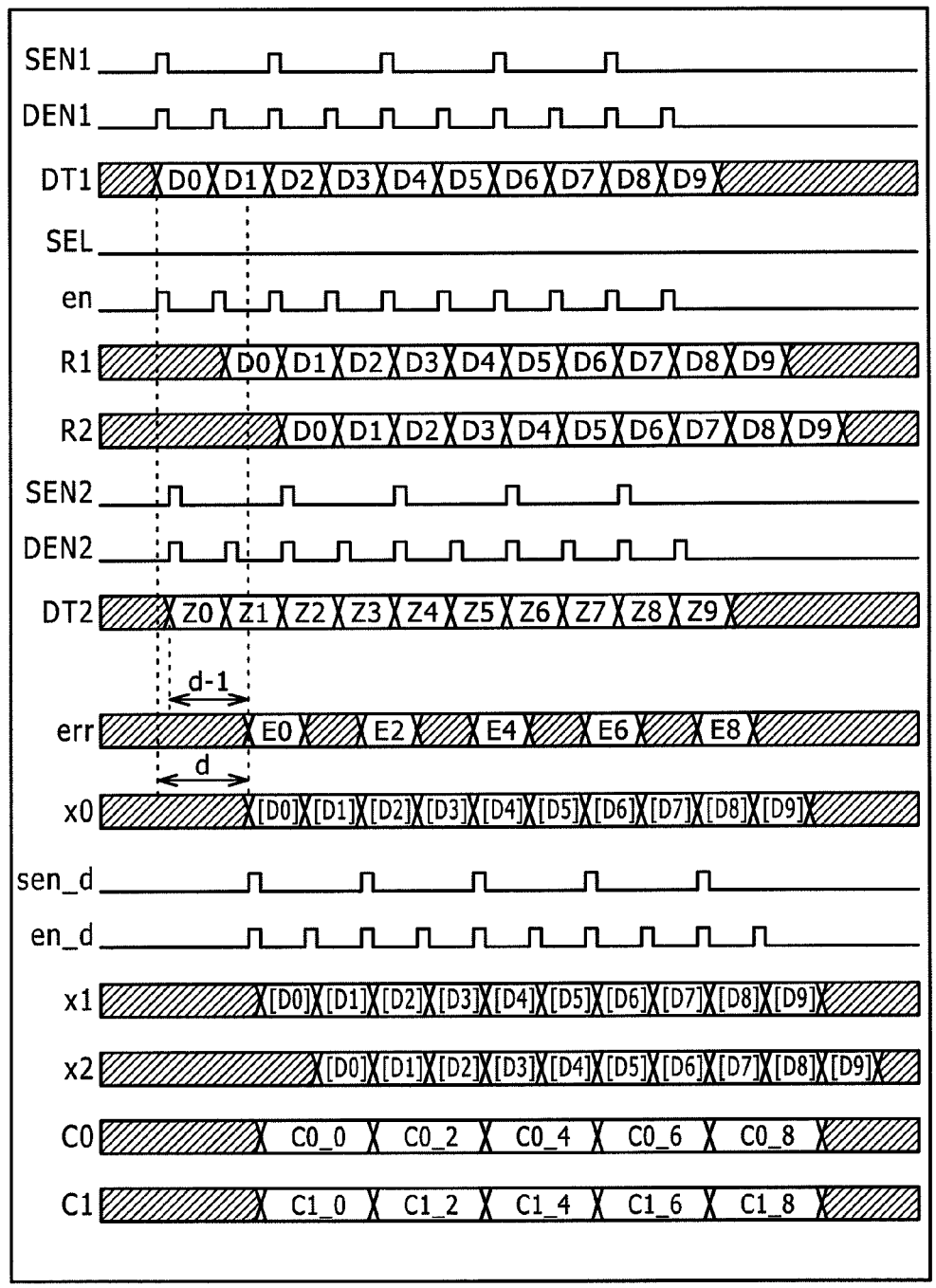
FIG. 16 is a timing chart explanatory of an adaptive equalizer operating in fractionally spaced mode.

Described below in reference to the timing chart of FIG. 16 is the adaptive equalizer 101 operating in fractionally spaced mode.

In FIG. 16, as in FIG. 15, the timings of SEN1, DEN1, DT1, SEL, en, R1, R2, SEN2, DEN2, DT2, err, x0, sen_d, en_d, x1, x2, C0, and C1 are shown from the top down in chart form.

Also, the portions in FIG. 16 which correspond to those in the timing chart of FIG. 15 are repetitive and thus will not be discussed further hereunder where appropriate.

When the adaptive equalizer 101 is made to operate in fractionally spaced mode, the level of SEL input to the selector 111 is brought Low. The level of en goes High at intervals of the half symbol period in keeping with DEN1.

Since the level of SEL is kept Low in fractionally spaced mode, R1 and R2 are shifted at the timing of DEN1, i.e., at intervals of the half symbol period.

In this manner, the registers $131_1$ through $131_3$ shift and hold their data at the timing of DEN1. Thus the product-sum operations subsequent to the registers $131_1$ through $131_3$ are performed on the successively input data and on the filter coefficient.

Then, the result of the product-sum operations is held in the register 113 and output as DT2 at the timing of DEN1. That is, Z0, Z1, Z2, Z3, Z4, Z5, Z6, Z7, Z8, Z9, . . . resulting from the product-sum operations performed on DT1 and on the outputs from the registers $131_1$ through $131_3$ as well as on the filter coefficients $C_{30}$ through $C_{33}$ are output at the timing of DEN1.

Incidentally, the adaptive equalizer 101 in FIG. 14 is assumed to have the delay of d−1 clock pulses as mentioned above. Thus as shown in FIG. 16, the error signal computing section 123 illustratively computes E0 delayed by d−1 clock pulses relative to Z0 as err. The delay circuit $117_2$ delays D0 by d clock pulses to attain synchronism with E0.

The registers $118_1$ through $118_3$ shift and hold their data at the timing of en_d. Thus the operations subsequent to the registers $118_1$ through $118_3$ are performed on the successively input data such as D0, D1, D2, D3, D4, D5, D6, D7, D8, D9, . . . .

Also, the registers $122_1$ through $122_4$ shift their retained data at the timing of sen_d. This causes the filter coefficient C0 to be output at the timing of sen_d such as C0_0, C0_2, C0_4, C0_6, C0_8, . . . . Likewise the filter coefficient C1 is output at the timing of sen_d such as C1_0, C1_2, C1_4, C1_6, C1_8, . . . .

In the manner described above, the adaptive equalizer 101 operates in fractionally spaced mode.

As described, the adaptive equalizer 101 does not incorporate two waveform equalizers and select between the two equalizers. Instead, the fixed coefficient equalizer 101 incorporates a single waveform equalizer that is controlled to select between symbol rate mode and fractionally spaced mode. This makes it possible to switch the waveform equalizer between different operation rates while having the circuit resources such as registers and product-sum operation circuits shared between the switched rates.

In that way, it is possible to build substantially the same scope of circuitry as one waveform equalizer and still be able to switch between the symbol rate equalizer and the fractionally spaced equalizer.

Also, in keeping with the channel to be equalized, either symbol rate mode or fractionally spaced mode can be selected freely, so that higher receiving characteristics are made available than before.

The series of the processes described above may be executed either by hardware or by software. Where the processes are to be carried out by software, the programs constituting the software may be either incorporated beforehand in the dedicated hardware of the computer to be used or installed from a suitable program recording medium into a general-purpose personal computer or like equipment capable of executing diverse functions.

FIG. 17 is a block diagram showing a typical structure of a personal computer for executing the above-described series of processes using programs. A CPU (Central Processing Unit) 211 performs various processes in accordance with the programs recorded in a ROM (Read Only Memory) 212 or a recording section 218. A RAM (Random Access Memory) 213 may store necessary programs and data to be executed and operated on by the CPU 211. The CPU 211, ROM 212, and RAM 213 are interconnected by a bus 214.

An input/output interface 215 is also connected to the CPU 211 via the bus 214. The input/output interface 215 is connected with an input section 216 typically made of a microphone and with an output section 217 typically composed of a display and speakers. The CPU 211 carries out various processes in response to commands that are input from the input section 216. The CPU 211 outputs the result of the processing to the output section 217.

The recording section 218 connected to the input/output interface 215 is illustratively constituted by a hard disk, and records the programs and diverse data to be executed and operated on by the CPU 211. A communication section 219 communicates with external devices via networks such as the Internet and local area networks.

Also, programs may be acquired through the communication section 219 and recorded to the recording section 218.

When removable media 221 such as magnetic disks, optical disks, magneto-optical disks or semiconductor memories are attached to a drive 220 connected to the input/output interface 215, the drive 220 drives the attached medium to acquire programs and data therefrom. The programs and data thus acquired are transferred as needed to the recording section 218 for storage therein.

As shown in FIG. 17, the program recording media for accommodating computer-installable, computer-executable programs are constituted either by the removable media 221 provided as package media such as magnetic disks (including flexible disks), optical disks (including CD-ROM (Compact Disc Read-Only Memory) and DVD (Digital Versatile Disc)), magneto-optical disks, or a semiconductor memory; or by the ROM 212 and a hard disk drive making up the recording device 218 having the programs stored thereon temporarily or permanently. The programs may be recorded to the program recording media via the communication section 219 such as a router or a modem interfaced with wired or wireless communication media including local area networks, the Internet, and digital satellite broadcasts.

Incidentally, in this specification, the steps describing the programs stored on the storage medium represent not only the processes that are to be carried out in the depicted sequence (i.e., on a time series basis) but also processes that may be performed parallelly or individually and not chronologically.

Also in this specification, the term "system" refers to an entire configuration made up of a plurality of component devices.

Furthermore, it should be understood that the present invention when embodied is not limited to the above-described embodiments and that various modifications, variations and alternatives may be made of the invention so far as they are within the scope of the appended claims or the equivalents thereof.

The invention claimed is:

1. A waveform equalizer for performing waveform equalization of an input signal, said waveform equalizer comprising:
   a filter including at least a group of delay devices connected serially to delay said input signal successively, a group of multipliers for multiplying an output from each of said delay devices by a filter coefficient, and a group of adders for adding up outputs from said multipliers in order to acquire a waveform-equalized output signal; and
   timing signal selecting means for selecting either a first or a second timing signal for driving said filter based on an instruction input to the waveform equalizer, said first timing signal driving said filter at intervals of a period of a symbol frequency of said input signal, said second timing signal driving said filter at intervals of a period shorter than that of said symbol frequency;

wherein said filter is driven (a) as a symbol rate equalizer when said first timing signal is selected and (b) as a fractionally spaced equalizer when said second timing signal is selected.

2. The waveform equalizer according to claim 1, wherein said timing signal selecting means first selects said second timing signal to drive said filter as said fractionally spaced equalizer, then switches from said second timing signal to said first timing signal in keeping with the value of said filter coefficient after an error signal has settled, and drives said filter as said symbol rate equalizer using said first timing signal.

3. The waveform equalizer according to claim 1, wherein said timing signal selecting means selects either said first timing signal or said second timing signal in such a manner as to minimize channel error rate.

4. The waveform equalizer according to claim 1, wherein said timing signal selecting means selects either said first timing signal or said second timing signal in such a manner as to minimize an error signal inside said waveform equalizer.

5. The waveform equalizer according to claim 1, wherein said filter coefficient is a predetermined fixed value, and wherein said filter is driven as a fixed coefficient equalizer based on said filter coefficient.

6. The waveform equalizer according to claim 1, wherein said filter coefficient is a value determined adaptively based on adaptive equalization algorithm, and wherein said filter is driven as an adaptive equalizer based on said filter coefficient.

7. The waveform equalizer according to claim 1, wherein the period shorter than that of said symbol frequency has a frequency that is an integer multiple of said symbol frequency.

8. A method for controlling a waveform equalizer for performing waveform equalization of an input signal, said waveform equalizer having a filter including at least a group of delay devices connected serially to delay said input signal successively, a group of multipliers for multiplying an output from each of said delay devices by a filter coefficient, and a group of adders for adding up outputs from said multipliers in order to acquire a waveform equalized output signal, said method comprising the steps of:

selecting either a first or a second timing signal for driving said filter based on an instruction input to the waveform equalizer, said first timing signal driving said filter at intervals of a period of a symbol frequency of said input signal, said second timing signal driving said filter at intervals of a period shorter than that of said symbol frequency; and driving said filter (a) as a symbol rate equalizer when said first timing signal is selected and (b) as a fractionally spaced equalizer when said second timing signal is selected.

9. A receiving apparatus for receiving a modulated signal derived from digital modulation of a carrier wave, said receiving apparatus comprising a waveform equalizer, said waveform equalizer including:
a filter including at least a group of delay devices connected serially to delay said input signal successively, a group of multipliers for multiplying an output from each of said delay devices by a filter coefficient, and a group of adders for adding up outputs from said multipliers in order to acquire a waveform-equalized output signal; and timing signal selecting means for selecting either a first or a second timing signal for driving said filter based on an instruction input to the waveform equalizer, said first timing signal driving said filter at intervals of a period of a symbol frequency of said input signal, said second timing signal driving said filter at intervals of a period shorter than that of said symbol frequency;

wherein said filter is driven (a) as a symbol rate equalizer when said first timing signal is selected and (b) as a fractionally spaced equalizer when said second timing signal is selected.

10. A method for controlling a receiving apparatus for receiving a modulated signal derived from digital modulation of a carrier wave, said receiving apparatus having a waveform equalizer, said waveform equalizer including:
a filter including at least a group of delay devices connected serially to delay said input signal successively, a group of multipliers for multiplying an output from each of said delay devices by a filter coefficient, and a group of adders for adding up outputs from said multipliers in order to acquire a waveform-equalized output signal; and timing signal selecting means for selecting either a first or a second timing signal for driving said filter, said first timing signal driving said filter at intervals of a period of a symbol frequency of said input signal, said second timing signal driving said filter at intervals of a period shorter than that of said symbol frequency, said method comprising the step of selecting either a first or a second timing signal for driving said filter based on an instruction input to the waveform equalizer, said first timing signal driving said filter at intervals of a period of a symbol frequency of said input signal, said second timing signal driving said filter at intervals of a period shorter than that of said symbol frequency; and driving said filter (a) as a symbol rate equalizer when said first timing signal is selected and (b) as a fractionally spaced equalizer when said second timing signal is selected.

* * * * *